United States Patent [19]
Barbara et al.

[11] Patent Number: 5,524,240
[45] Date of Patent: Jun. 4, 1996

[54] METHOD AND APPARATUS FOR STORAGE AND RETRIEVAL OF HANDWRITTEN INFORMATION

[75] Inventors: Daniel Barbara, Princeton, N.J.; Henry F. Korth, Ambler, Pa.

[73] Assignee: Panasonic Technologies, Inc., Princeton, N.J.

[21] Appl. No.: 324,231

[22] Filed: Oct. 17, 1994

Related U.S. Application Data

[63] Continuation-in-part of Ser. No. 248,392, May 24, 1994, abandoned.

[51] Int. Cl.⁶ ............................ G06F 15/40; G06F 15/62; G06F 15/407
[52] U.S. Cl. .................... 395/600; 395/700; 395/100; 395/183.14; 364/237.6; 364/931.51
[58] Field of Search ................................ 395/600, 575, 395/1, 100; 382/13

[56] References Cited

U.S. PATENT DOCUMENTS

| | | | |
|---|---|---|---|
| 4,718,102 | 1/1988 | Crane et al. | 382/13 |
| 4,989,258 | 1/1991 | Takahashi et al. | 382/37 |
| 5,194,852 | 3/1993 | More et al. | 345/182 |
| 5,267,327 | 11/1993 | Hirayama | 382/13 |
| 5,285,505 | 2/1994 | Kim et al. | 382/13 |
| 5,303,367 | 4/1994 | Leenstra, Sr. et al. | 395/600 |
| 5,321,833 | 6/1994 | Chang et al. | 395/600 |
| 5,379,422 | 1/1995 | Antoshenkov | 395/600 |

OTHER PUBLICATIONS

Harriehausen–Muhlbauer et al., "Script—A Prototype for therecognition of continuous, cursive, handwritten input by means of neural network simulator.", IEEE, 1993, pp. 1672–1677.

Dimitriadis et al., "On–line handwritten symbol recognition, using an Art based neural network hierarchy.", IEEE, 1993, pp. 944–949.

Paruzeau et al., "A comparative analysis of regional correlation, Dynamic time Warping, and skeletal tree matching for signature verification.", IEEE, Jul. 1990, vol. 12, No. 7, pp. 710–717.

Al–Emami et al., "On–line Recognition of Handwritten Arabic characters.", IEEE, Jul. 1990, vol. 12, No. 7, pp. 704–710.

Kundu et al, "Handwritten word recognition using HMM with adaptive length Viterbi Algorithm," IEEE, vol. 3, 1992, pp. 153–156.

*Primary Examiner*—Thomas G. Black
*Assistant Examiner*—C. Pham
*Attorney, Agent, or Firm*—Ratner & Prestia

[57] ABSTRACT

A method is provided for generating an indexed database stored in a computer system. A database is established. The database includes a plurality of data objects. Each data object is defined by a respective tuple of attributes. The attributes include at least one attribute having a domain of values that includes handwritten objects. Each handwritten object includes a plurality of symbols ordered in an output sequence. An index is established, having a root node and a plurality of leaf nodes. Each leaf node is connected to the root node by a respective path, such that each path from the root node to one of the plurality of leaf nodes corresponds to a respective input sequence of symbols. The input sequence for the respective leaf node includes a set of pointers to a subset of the tuples. A respective Hidden Markov Model (HMM) is executed to analyze the output sequence of each handwritten object and to determine a respective probability that each input sequence matches the output sequence. A pointer to any tuple for which the respective output sequence has at least a threshold probability of matching the input sequence (corresponding to the leaf node) is included in the respective set of pointers in each respective leaf node. The probability is determined by the respective HMM for the output sequence of each handwritten object.

11 Claims, 10 Drawing Sheets

| 600 → | 610 | 611 | 612 |
|---|---|---|---|
| | RECIPE_NAME | INGREDIENTS | QUANTITY |
| 602a | Pancakes | Flour | 10 |
| 602b | Pancakes | Milk | 20 |
| 602c | Pancakes | Eggs | 4 |
| 602d | Poundcake | Butter | 20 |
| 602e | Poundcake | Shortening | 10 |

FIG. 6A

| 650 → | 660 | 661 | 662 | 663 |
|---|---|---|---|---|
| | INGREDIENTS | INGREDIENTS | QUANTITY | KITCHEN_STOCK |
| 652a | Flour | Flour | 10 | 7 |
| 652b | Milk | Milk | 20 | 25 |
| 652c | Milk | Flour | 20 | 7 |
| 652d | Eggs | Eggs | 4 | 6 |

FIG. 6B

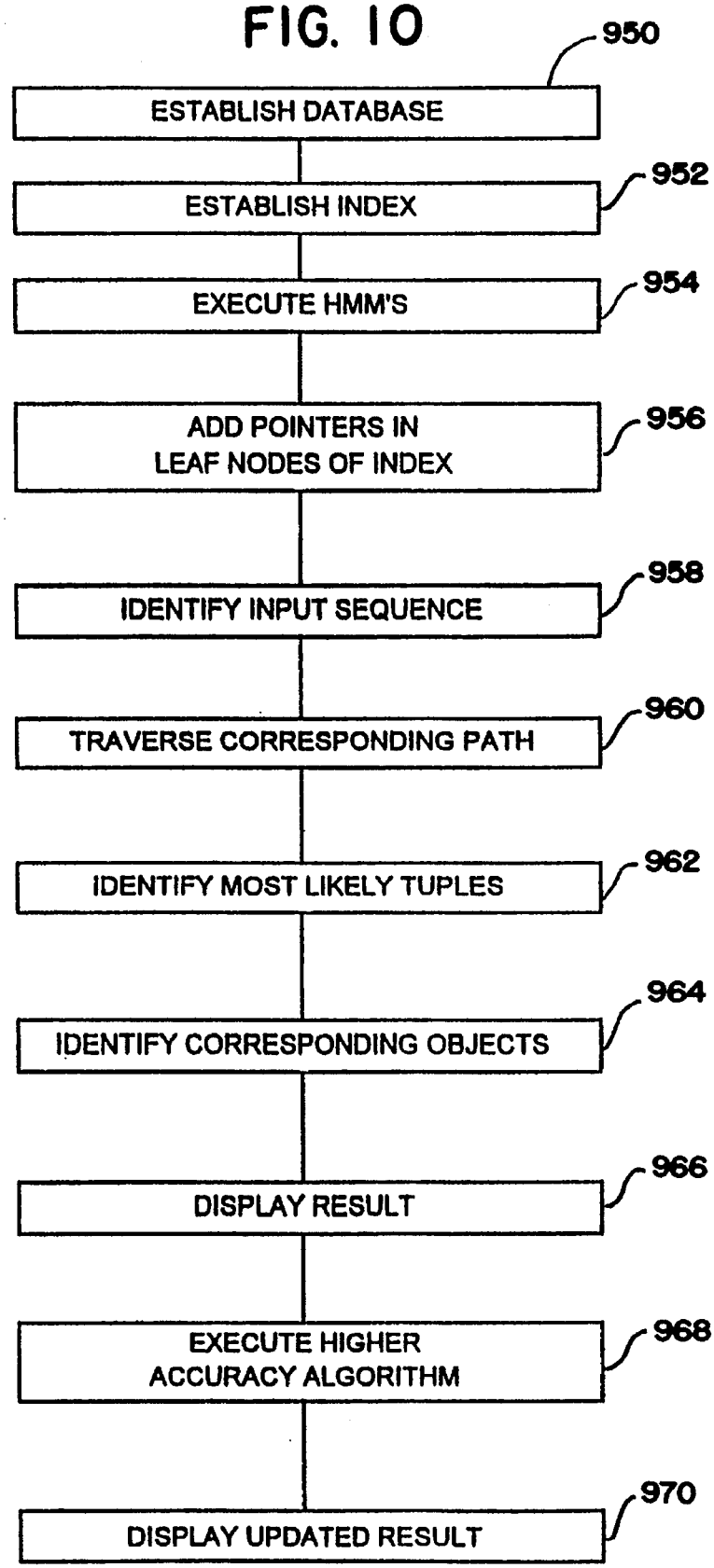

METHOD AND APPARATUS FOR STORAGE AND RETRIEVAL OF HANDWRITTEN INFORMATION

This application is a Continuation-in-Part of U.S. application Ser. No. 08/248,392, filed May 24, 1994 and now abandoned.

FIELD OF THE INVENTION

The present invention relates generally to methods for searching for documents in a database, and in particular to a method for indexing and searching for electronic handwritten documents.

BACKGROUND OF THE INVENTION

Electronic pictures and handwritten documents are entering common use in computers due to the introduction of pen based interfaces. Recent products have replaced the keyboard entirely by a pen with which all data entry is performed.

In a paper by D. Lopresti, and A. Tomkins, entitled "Pictographic Naming", INTERCHI '93 Adjunct Proceedings, April, 1993 (which is incorporated herein by reference for its teachings on use of pictographic names), the authors propose extending the range of acceptable document names to include arbitrary hand-drawn pictures. When a document is created or first stored in a storage medium, the author draws a pictographic name instead of typing in a textual name. To subsequently retrieve one of the documents, the pictographic names may be displayed in a menu or "browser", and the user selects the desired pictographic name.

If the database includes more than about 8–12 documents, it becomes impractical to display all of the pictographic names during retrieval.

In an alternative method to subsequently retrieve one of the documents, the pictographic name is redrawn using a pen based interface. Because the hand-drawn pictures are not drawn in exactly the same way each time, a pattern recognition technique is needed to determine which document (or output sequence) a given hand-drawn picture (or input sequence) is intended to represent.

One of the proposed techniques for identifying a document by its picto graphic name involves the use of Hidden Markov Models (HMM) to provide a list of candidate documents that have picto graphic names most closely resembling the input sequence. From this list, one file is selected using the pen. HMMs provide a powerful tool for picture and handwritten document matching. Several researchers have used HMMs to model handwriting and handwritten documents.

Rabiner, L. R., "A Tutorial on Hidden Markov Models and selected Applications in Speech Recognition", Proceedings of the IEEE, 77(2):257–285, February 1989, is incorporated by reference herein for its teachings on the use of Hidden Markov Models for pattern recognition.

Formally, an HMM is a doubly stochastic process that contains a non-observable underlying stochastic process (hidden) that is uncovered by a set of stochastic processes that produce the sequence of observed symbols. Mathematically an HMM is a tuple $<\sigma, Q, a, b>$, where:

1) $\sigma$ is a (finite) alphabet of output symbols. A symbol is typically a subset of a character.

2) Q is a set of states, $Q=\{0, \ldots, N-1\}$ for an N-state model.

3) a is a probability distribution that governs the transitions between states. The probability of going from state i to j is denoted by $a_{ij}$. The transition probabilities $a_{ij}$ are real numbers between 0 and 1, such that:

$$\text{for all } i \in Q: \sum_{j=0}^{N-1} a_{ij} = 1 \qquad (1)$$

The distribution includes the initial distribution of states, that is the probability $a_i$ of the first state being i.

4) b is an output probability distribution $b_i(s)$ that governs the distribution of output symbols for each state. That is, $b_i(s)$ is the probability of producing the symbol $s \in \sigma$ while being in state i. These probabilities follow the rules:

$$\text{For all } i \in Q \text{ and } s \in \sigma: 0 < b_i(s) \leq 1 \qquad (2)$$

$$\text{For all } i \in Q, \Sigma_{s \in \sigma} b_i(s) = 1 \qquad (3)$$

Usually, when HMMs are used, the transition probabilities (a) and the state set (Q) are computed by bestfitting the model to a series of samples. (This is known as training the model). Each sample consists of a sequence of output symbols (points), with which the parameters of the model may be adjusted. However, in applications such as recognition of handwritten documents, the model is described using a single sample (a sequence of output symbols for the document that is to be indexed). Quite commonly, then, the structure of the model is "fixed" to make up for the lack of samples with which to train it. That is, once a model is selected for an index, that model is used for the life of the index. The model is not changed dynamically after the index is created. For example, a left-to-right HMM may be used, i.e. a model in which it is only possible to remain in the current state or to jump to the next state in sequence.

For the handwritten document problem, each picture or document in the database is modeled by an HMM. As a result, given an input pattern, the recognition process involves executing each HMM in the database and selecting the one that generates the input pattern with highest probability. This is very time consuming. The primary impediment to using HMMs is execution speed, especially in the context of large databases. Executing a respective HMM for each document in the database in real-time to retrieve one of the documents introduces an unacceptable delay into the process of retrieving a document, making the use of pictographic names by this method impractical.

SUMMARY OF THE INVENTION

The present invention is a method for generating an indexed database stored in a computer system.

The method comprises establishing a database which includes a plurality of data objects. Each data object is defined by a respective tuple of attributes. (The term tuple is used herein according to its conventional meaning i.e., a part of a relation that identifies an entity and its attributes. In a relational database, a tuple is one row of a relation table.) The attributes include at least one attribute having a domain of values that includes handwritten objects. Each handwritten object includes a plurality of symbols ordered in an output sequence.

An index is established, having a root node and a plurality of leaf nodes. Each leaf node is connected to the root node by a respective path, such that each path from the root node to one of the plurality of leaf nodes corresponds to a respective input sequence of symbols. The input sequence for the respective leaf node includes a set of pointers to a subset of the tuples.

A respective Hidden Markov Model (HMM) is executed to analyze the output sequence of each handwritten object and to determine a respective probability that each input sequence matches the output sequence.

A pointer to any tuple for which the respective output sequence has at least a threshold probability of matching the input sequence (corresponding to the leaf node) is included in the respective set of pointers in each respective leaf node. The probability is determined by the respective HMM for the output sequence of each handwritten object.

BRIEF DESCRIPTION OF THE DRAWINGS

FIGS. 6A and 6B are diagrams of result relations formed by performing select and join operations, respectively, on the database shown in FIG. 5.

FIG. 10 is a flow chart diagram showing the exemplary method of establishing and querying the database shown in FIG. 5.

OVERVIEW

Figure 1:
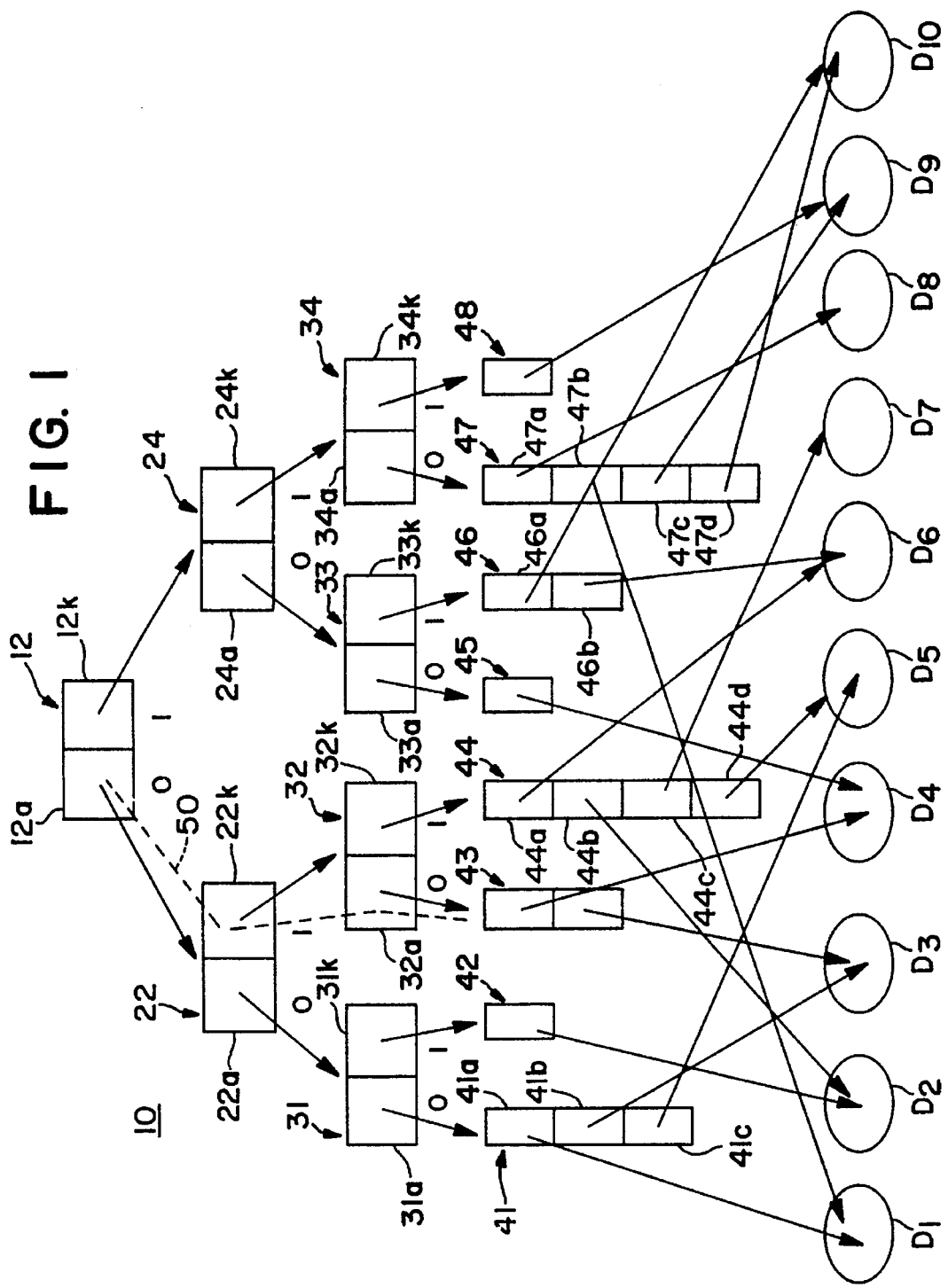
FIG. 1 is a block diagram of an exemplary information tree according to the invention.

Referring to FIG. 1, one aspect of the present invention is a method for indexing a plurality of electronic handwritten objects, which may include handwritten documents, such as documents $D_1$–$D_{10}$. The method is adapted for use in personal digital assistants (PDA's), but may also be extended to other hardware systems employing a pen based interface.

For simplicity, FIG. 1 shows a simplified index in which the alphabet has only two symbols (0 and 1), and the sequence length is three symbols. According to the invention, the features of each object are analyzed using HMMs, in a preprocessing stage at the time of indexing, and stored in the index.

The results of the HMM analysis are subsequently used for matching input sequences having similar features during object retrieval operations. It is not necessary to run the HMMs each time that an object is retrieved. During retrieval, the features are simply compared to the stored sequences in the index, and the results of the previously executed HMMs identify the objects that have a high probability of being represented by the sequence of input symbols. Thus, when the input sequence is detected, it is not directly interpreted to identify the matching output sequence; instead, it is compared to output sequences previously associated with stored handwritten objects using the stored HMMs.

In the first exemplary embodiment, the objects are a plurality of handwritten documents stored in a repository or database. The method of building and applying the index is first described with reference to a database which comprises handwritten documents, as shown in FIG. 1.

Each document $D_1$–$D_{10}$ includes a plurality of symbols, ordered in an output sequence. When a document is added to the database, a fixed integral number (T) of symbols from the document are used for indexing. The T symbols may form a pictographic name, or they may be the first T symbols within the text of the document itself. In the exemplary embodiment, the output sequence length T is the number of symbols in the document name.

Each document $D_1$–$D_{10}$ is modeled by a respective Hidden Markov Model (HMM). The HMMs have a common alphabet including n output symbols, and a common output sequence length of T symbols, where n is an integer. Hereafter, references to the output symbols in the document are used to indicate the output symbols in the name of the document.

The index is built as a tree 10. The tree 10 has T+1 levels (where T is the number of steps or length of the output sequence in the HMMs associated with the documents in the repository or database). The root of the tree 10 is the node 12 at level 0 and is denoted by r. Each level of the tree corresponds to a respective successive symbol in the document. Each level of the tree 10 is associated with a threshold value that controls the accuracy of the searches.

Each internal node 12, 22, 24, and 31–34 (including the root node 12) in the tree 10 is an n-tuple, where each entry in the n-tuple corresponds to a respectively different symbol of the output alphabet σ and has a pointer to a subtree. v[k] denotes the $k^{th}$ entry on the node v, where k is an integer between 0 and n (in the example shown in FIG. 1, n=2).

Each internal node 31–34 in the T-$1^{th}$ level points to a leaf node 41–48 in the $T^{th}$ level that contains a linked list of pointers. For example, linked list 41 includes pointers 41a–41c. The linked lists 41–48 store pointers to the files $D_1$–$D_{10}$ that contain the documents in the repository.

Successive pointers within respective branches of the tree form sequences of pointers. For example, FIG. 1 shows a sequence 50 of pointers for the input sequence 0, 1, 0. That is, given the first input symbol, 0, the $zero^{th}$ pointer 12a of node 12 points to node 22. Given the next input symbol, 1, the $one^{th}$ pointer 22k of node 22 points to node 32. Given the next input symbol, 0, the $zero^{th}$ pointer 32a of node 32 points to leaf node 43.

One of ordinary skill will understand that there is a one-to-one correspondence between the possible input sequences and the leaf nodes. Table 1 lists the input sequences shown in FIG. 1, and the corresponding leaf nodes (identified by reference numeral).

TABLE 1

| Input Sequence | Ref No. |
|---|---|
| 0,0,0 | 41 |
| 0,0,1 | 42 |
| 0,1,0 | 43 |
| 0,1,1 | 44 |

TABLE 1-continued

| Input Sequence | Ref No. |
| --- | --- |
| 1,0,0 | 45 |
| 1,0,1 | 46 |
| 1,1,0 | 47 |
| 1,1,1 | 48 |

When a document $D_1-D_{10}$ is added to the index 10, the HMM for the document is executed. A pointer to the document $D_1-D_{10}$ is added to the respective linked list (e.g., 41a–41c) in the leaf node 41–48 of each branch of index 10 for which the corresponding input sequence has at least a threshold probability of matching the output sequence for that document. During query operations, once an input sequence is identified, the leaf node 41–48 corresponding to the identified input sequence provides pointers to the objects (documents) that have at least the minimum threshold probability of containing that sequence, without re-executing the HMM for that document. This allows substantial reduction in time to respond to a query.

Figure 7A:
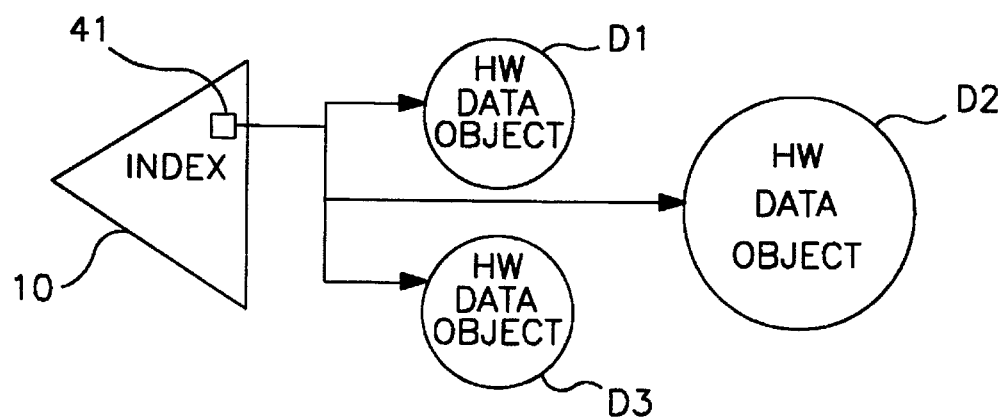
FIGS. 7A and 7B are schematic diagrams showing the document database and the handwritten database, respectively.

As described above, index 10 points to the actual data objects $D_1-D_{10}$ (as shown schematically in FIG. 7A). According to another aspect of the invention, the index may be used for indexing a more general database in which a plurality of data objects are each defined by a respective tuple of attributes, and at least one of the attributes has a domain of values that includes handwritten objects. This method allows pen-based entry of object attributes in databases that are stored in a personal digital assistant or palm-top computer.

Figure 7B:
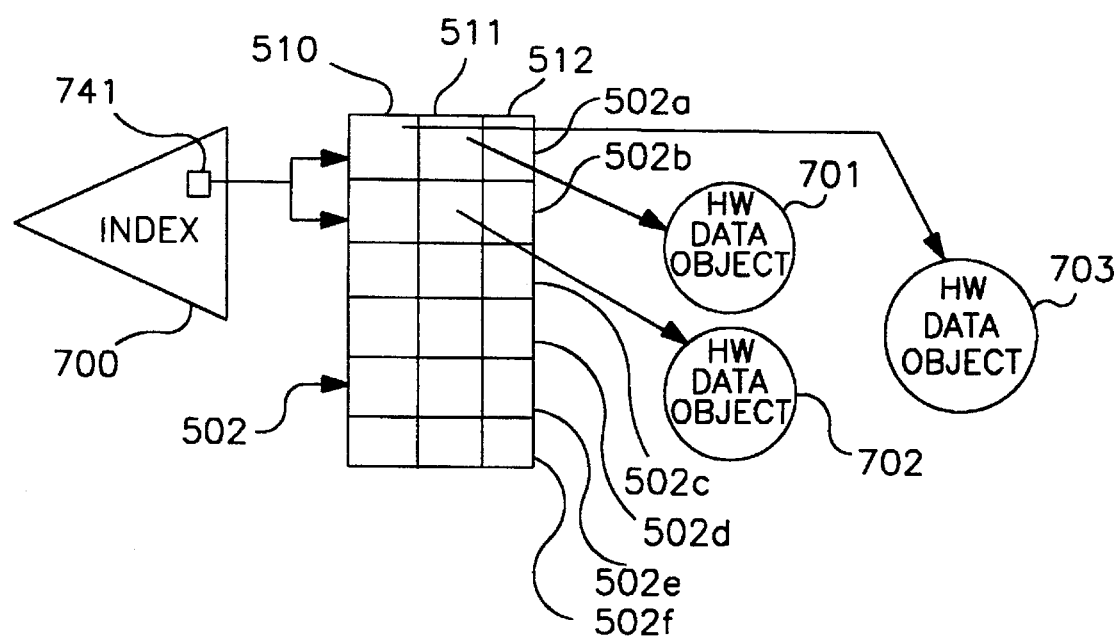

FIG. 7B is a schematic diagram of an index 700 that points to attributes 510 and 511 of a relation in a relational database 502. Index 700 may have the same structure as either index 10 (shown in FIG. 1) or index 300 (shown in FIG. 4C). Attributes 510 and 511 each have respective domains that include handwritten objects. For example, the value of the handwritten attribute may be a picture or label that is used when querying the database. The attributes 510–512 in turn define individual handwritten data objects 701–703.

As in the first exemplary embodiment, each handwritten object is modelled by a respective Hidden Markov Model (HMM). The index 700 is established using the handwritten attribute 511 or 512 as a search key. Each path from the root node of index 700 to one of the leaf nodes (e.g., 741) of index 700 corresponds to a respective sequence of symbols. Each respective leaf node 741 includes a set of pointers to a subset of the tuples 502a–502f in relation 502. Each subset includes tuples (e.g., 502a, 502b) for which the value of the handwritten attribute (object) has at least a threshold probability of matching the respective sequence corresponding to that leaf node, as determined by the HMMs.

For example, as shown in FIG. 7B, attribute 511 may be used as the search key. Leaf node 741 in index 700 includes a list of pointers to tuples 502a and 502b in relation 502. The values of handwritten attribute 511 for tuples 502a and 502b each have at least a minimum threshold probability of matching the respective input sequence corresponding to leaf node 741.

According to a further aspect of the invention, relational algebra operations are defined for databases in which at least one attribute has a domain of values that includes handwritten objects. These operations are discussed below with reference to FIGS. 6A and 6B.

According to still another aspect of the invention, a Pen-Based Query-by-Example (PQBE) system is provided. PQBE allows a user to query the database by inputting handwritten objects into a skeleton table using a stylus and electronic digitizer pad (such as a digitizer pad in a personal digital assistant, or palm-top computer). These operations are discussed below with reference to FIG. 8.

DETAILED DESCRIPTION

BUILDING THE INDEX

Referring again to FIG. 1, the method for indexing a plurality of handwritten documents according to the first exemplary embodiment of the invention is now described in detail. To insert a document, a set of T output symbols are extracted from the document. In the example of FIG. 1, three symbols (T=3) are extracted, each symbol being a zero or a one.

There are $n^T$ possible output sequences, based on an alphabet of n symbols, and a sequence length T. Thus the tree 10 (as shown in FIG. 1) has $n^T$ leaf nodes 41–48, one for each respective possible output sequence. According to a first exemplary embodiment, the HMM for the document $D_1-D_{10}$ being inserted is executed $n^T$ times during the preprocessing (insertion) stage (Each HMM is executed a respectively different time for every possible sequence). If the HMM determines that the probability of a given output sequence representing the output sequence of the document is greater than a threshold value, then a pointer to that document is added to the linked list identified by the sequence of pointers corresponding to that output sequence. This determination is made for each leaf node 41–48.

For example, given the tree 10, the HMM for document $D_1$, designated $HMM_1$ is executed eight times (once for each of the output sequences listed in Table 1). When $HMM_1$ is executed for a given output sequence, $HMM_1$ determines the probability that the output sequence represents the T symbols in the output sequence of document $D_1$. As shown in FIG. 1, only two of the output sequences (0,0,0 and 1,1,0) have the desired probability of representing the output sequence (i.e., the probability is greater than the threshold). Therefore, pointers 41a, 47b to document $D_1$ are added to the respective linked lists of leaf nodes 41 and 47.

The linked lists are completed by executing each of the other HNMs (designated $HMM_2, \ldots, HMM_{10}$) eight times, once per possible output sequence. A pointer to each document $D_2-D_{10}$ is then added to the linked list of each leaf node 41–48 for which the probability of the respective output sequence being equal to the document output sequence exceeds the desired threshold.

Once the documents are thus processed and indexed, retrieval of a document or set of documents may be performed very quickly. To retrieve a document, the user draws the pictographic name with the input device. The input sequence of symbols are detected. Using the one-to-one correspondence shown in Table 1, the leaf node 41–48 corresponding to the input sequence may be found, by traversing the tree (following the path of pointers from the root node 12 to the leaf node 41–48).

Alternatively, instead of storing pointers and traversing the tree, the location of the leaf node 41–48 may be computed as a function of the input sequence (because the tree is a complete tree with all of the nodes included). Once the leaf node is found, the user is presented with the list of documents contained in the linked list of the leaf node.

Preferably, the picto graphic names of the documents found by the search are displayed in picto graphic form within a menu, using a graphical user interface. The user then selects the desired document from the displayed list. In the example shown in FIG. 1, once the user draws the picto graphic name, in the exemplary embodiment of the invention, the documents having the closest one to four names are displayed for selection. Thus, if the user drew a pictograph having the input symbols 0,1,0 (represented by sequence 50), then the system displays the picto graphic names of documents $D_3$ and $D_4$. The user is spared the complexity of having to choose from among 10 documents, and the delays that would accompany execution of the HMMs during the document retrieval operations are avoided.

The first exemplary embodiment described above works well if the size of the alphabet and the number of symbols in the name of each document is relatively short. For example, in the index shown in FIG. 1, with two symbols in the alphabet, and a sequence length of three symbols, the total number of nodes in the tree is 15.

If, however, the size of the alphabet or the output sequence length becomes large, then the size of the index and the length of time required to create it grow exponentially. For example, if there are 50 symbols in the output sequence, and the alphabet includes 250 symbols, then the index has about $10^{120}$ nodes. This makes the first exemplary method described above impractical for many databases.

Figure 3:
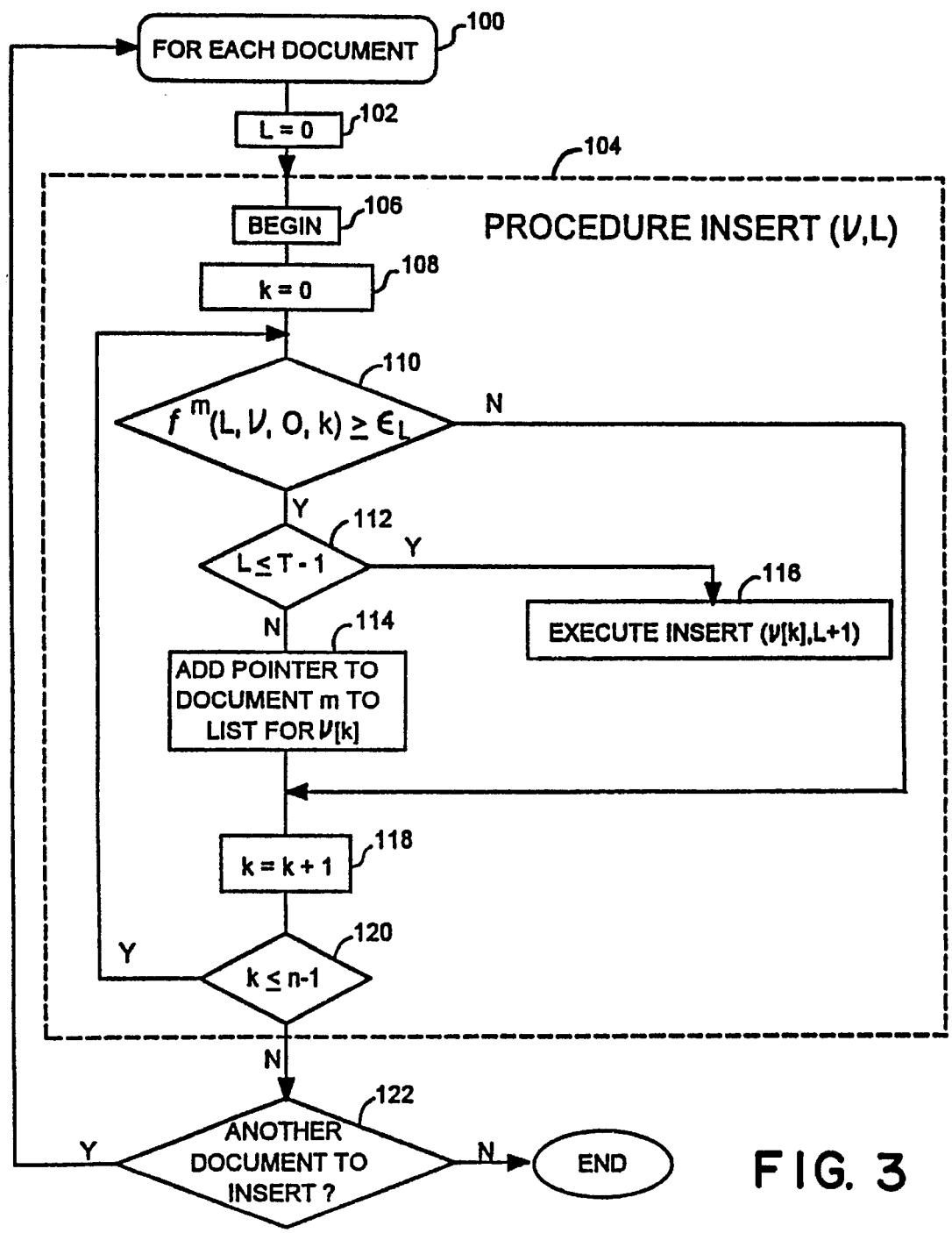
FIG. 3 is a flow chart diagram of the procedure that indexes documents in the information tree of FIG. 1.

To reduce the amount of time required to create the index, the second exemplary method, described below with reference to FIG. 3, provides a technique for only computing probabilities and storing index entries for the branches of the tree that are likely to have leaf nodes that point to one or more documents. The second exemplary embodiment may use the same index as shown in FIG. 1. The details of the method are shown in the flow chart diagram of FIG. 3.

According to a further aspect of the invention, tree 10 may only contain nodes for each document identifying the input symbols at each level that have at least a threshold probability of representing the output sequence of the document at that level, reducing the size of tree 10 considerably. This aspect of the invention is explained in greater detail below with reference to FIGS. 4A–4C.

It will be understood that, although the exemplary index is built up over time—adding pointers to each document to the index as the document is added to the database—an index according to the invention may also be constructed for an existing database in the same manner described herein. The respective HMM for each document executed for each input sequence and the pointers to the documents are added to the leaf nodes of the index.

METHOD

To insert a document, a set of T output symbols are extracted from the document. Although the simplified example shown in FIG. 1 only includes two symbols, the exemplary alphabet for handwritten documents includes 16 symbols. The hand-drawn figure is divided into points, and each point is represented by a symbol. In the exemplary symbol alphabet, four features are extracted per point: direction, velocity, change of direction and change of velocity. Each feature is drawn from a set of four possible values, hence the feature vector (symbol) for a point is represented using four pairs of bits. In the exemplary symbol alphabet, each one of the output symbols in σ is described by an eight bit vector value. It is contemplated that other equivalent symbol alphabets may be used. It is understood by one of ordinary skill in the art that each node in the tree has 16 entries for this exemplary alphabet; the full tree is not shown in the figures for brevity.

Figure 2:
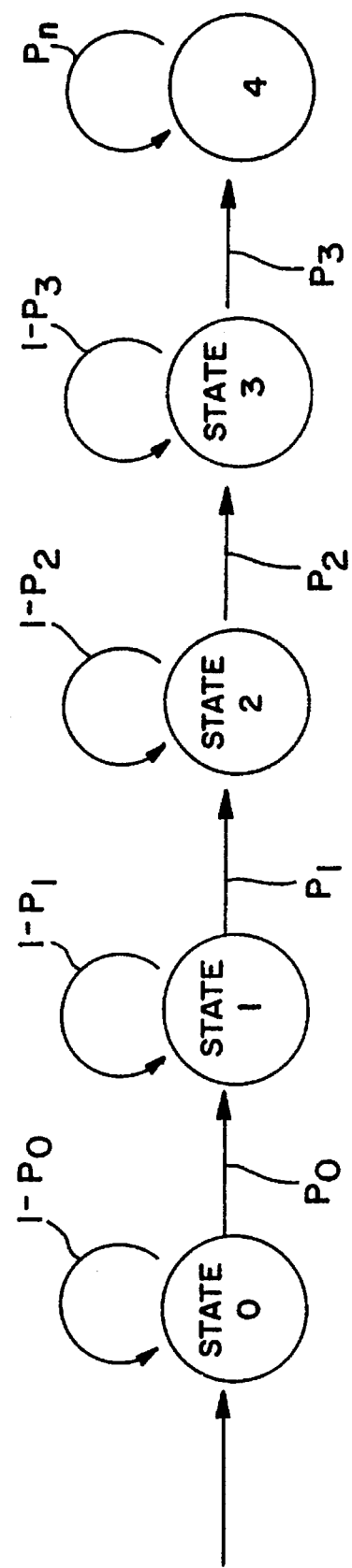
FIG. 2 is a state diagram of a Hidden Markov Model used in the exemplary information tree of FIG. 1.

It is presumed that the individual symbols are detected by a conventional technique, such as a pen based interface. In the exemplary embodiment, once the individual symbols are detected, a left-to-right HMM is used to analyze the symbols. A left-to-right HMM is a model in which it is only possible to remain in the current state or to jump to the next state in sequence. An example of such an HMM is shown in FIG. 2. This model contains 5 states numbered from 0 to 4. In the exemplary HMM, the probability $p_i$, of jumping from state i to state i+1 is 0.5 for $0 \leq i \leq n-1$, while the probability of staying in the same state $(1-p_i)$ is 0.5. The probability $p_n$ of staying in the last state, once it is reached, is 1.0. It is understood by one skilled in the art that other HMMs may be used, so long as the selected HMM remains fixed throughout the life of the index and is not dynamically changed.

Each level L $(0 \leq L \leq T)$ in the tree is assigned a respective minimum probability value $\epsilon_L$ $(0 \leq \epsilon_L \leq 1)$.

For each node q in the tree 10, at level L, and each symbol o in the output alphabet, $O_q = O[i_1]O[i_2]\ldots O[i_L]$ denotes the sequence of symbols in the path from the root 12 of the tree to the node q. Then there is an associated pruning function $f^m(L, q, O_q, o)$ that is computable for every HMM (i.e., for every document) in the database.

Referring now to FIG. 3, an exemplary embodiment featuring another aspect of the invention is shown. A loop comprising steps 100, 102, 104 and 122 is executed. Step 100 selects one of the documents for which the loop is to be executed. At step 102, the level is reset to zero (the root node) before beginning the insertion procedure 104. For each document $D_1$–$D_{10}$ in the database, the procedure of step 104 is executed.

The insertion procedure of step 104 begins at step 108 by setting the value of k to zero. k is an integer index that has a value of 0 at the $zero^{th}$ node of each level of tree 10. At step 110, the pruning function computation is performed. For the combination of a given level L, a given node v, a subset O of the output sequence (including all of the nodes in the path between node v and the root), and a given value of the index k, the pruning function $f^m(L, v, O_v, k)$ provides the probability that each of the symbols in O represents the correct corresponding output symbol of the document $D_m$.

During step 110 of the insertion procedure, when processing node v at level L and output symbol k, if the condition $f^m(L, q, O_v, k) \geq \epsilon L$ is true, then at step 112, the subtree beginning with node v[k] is investigated. Otherwise, the entire subtree beginning with node v[k] is skipped by the insertion algorithm, by following the "No" branch of decision step 110. This reduces the number of probability computations, and hence, the time required to index each document when inserting the document into the database.

If the "Yes" branch of step 110 is taken, then at step 112, the level of the current node is checked if the current node is an internal node (i.e., $L \leq T-1$), then control passes to step 116, where the insertion procedure of step 104 is executed recursively for the branch of the tree to which the $k^{th}$ entry (pointer) of the current node points. During the recursive execution of step 104, when the check at step 112 determines that the current level L is the $T^{th}$ level (a leaf node), then a pointer to document $D_m$ is added to the list of pointers stored in the leaf node.

At steps 118 and 120, once the index processing for $D_m$ is complete in the current subtree, any remaining subtrees are investigated by repeating steps 110–120 for each value of k (i.e., each node at the given level). When the value of k reaches n, processing for this document is completed, and at step 122, another document may be processed by transferring control to step 100.

As an example, referring again to FIG. 1, assume that document $D_7$ is being inserted into the database. From the symbol detection facility of the input device, a symbol string of 0, 1, 1 is detected. Processing begins at the root node 12. At step 110, for the zero$^{th}$ entry 12a of node 12 (which points to node 22), the function $f^m$ returns a probability greater than the minimum probability $\epsilon_0$ of the zero$^{th}$ level. Therefore, the branch to which entry 12a points is investigated.

At step 116, for the zero$^{th}$ entry 22a of node 22, the function $f^m$ returns a probability less than the minimum probability $\epsilon_1$ of the one$^{th}$ level, so the branch to which entry 22a points is not investigated. No probability calculations are performed for node 31. Next, for the one$^{th}$ entry 22k of node 22 (which points to node 32), the function $f^m$ is evaluated for the partial sequence 0, 1, and returns a probability greater than $\epsilon_1$. Therefore, the branch to which entry 22k points is investigated.

Evaluating the function $f^m$ at node 32, the probability is less than the minimum probability ($\epsilon_2$) for level two when evaluated for entry 32a, and is greater than $\epsilon_2$ when evaluated for entry 32k. Therefore, a pointer to document D7 is stored in the list 44 to which entry 32k points.

Next, the function $f^m$ is evaluated for the one$^{th}$ entry 12k of node 12. The function returns a probability value that is less than $\epsilon_0$, so the branch to which entry 12k points is not evaluated.

Using the procedure of FIG. 3, the probability computations for document $D_7$ are thus avoided at nodes 31, 24, 33 and 34. Although the insertion delay (the preprocessing time when adding the document to the repository) is reduced, the index produced by the method of FIG. 3 still uses the same amount of memory shown in FIG. 1 for a tree in which n=2 and T=3. According to another aspect of the invention, the space occupied by the index may be reduced as well.

According to a further aspect of the invention, an array may be maintained for each document identifying all of the input symbols at each level that have a probability value of at least $\epsilon_L$ of representing the output sequence of the document at that level. By maintaining an array identifying the highly probable symbols at each level in each document, the size of tree 10 may be reduced considerably.

Referring to the example of document $D_1$ in FIG. 1, if document $D_1$ were the only document in the database, then because this document is associated with both leaf nodes 41 and 47, the tree would only include nodes 12, 22, 24, 31, 34, 41 and 47. The array would identify node 12 at level zero, nodes 22 and 24 at level 1, and nodes 41 and 47 at level two. Nodes 32, 33, 42–46 and 48 would not be included in the tree. When the size of the alphabet or the length of the document name is large, this aspect of the invention provides great reduction in the size of the tree.

Table 2 provides exemplary pseudocode for executing the method of FIG. 3

TABLE 2

| | |
|---|---|
| 200 | Procedure Build_Index |
| 202 | begin |
| 204 |   for each document |
| 206 |     Let r be the root of the tree |
| 208 |     level = 0 |

TABLE 2-continued

| | |
|---|---|
| 210 |     call search(r, level) |
| 212 |   end |
| 220 | Procedure search(v,1) |
| 222 | begin |
| 224 |   for $0 \leq k \leq n-1$ |
| 226 |     if $(f^m(1,v,O_v, k) \leq \epsilon_1)$ |
| 228 |       if $(1 \leq T-1)$ |
| 230 |         call search(v[k], 1+1) |
| 232 |       else |
| 234 |         include a pointer to $D_m$ in the list pointed to by v[k] |
| 236 | end |

During the insertion procedure of Table 2, when processing node v at level 1 and output symbol k (step 226), if the condition $(f^m(1, v, O_v, k) \geq \epsilon_1)$ is true, then at steps 228–230, the subtree v[k] is investigated. Otherwise, steps 228–234 are not executed, and the entire subtree is skipped by the insertion algorithm. This helps reduce the time to insert each document into the database.

Table 3 lists pseudocode for traversing the index during document retrieval. To select a set of documents that are similar to an input document D, a set of T output symbols $O=\{O[i], 0 \leq i \leq T, \text{ and } 0 \leq O[i] \leq n-1\}$ are extracted from the input sequence, and procedure traverse (listed in Table 3 is executed. Alternatively, the address of the leaf node may be computed from the set of output symbols O and the k HMMs associated with it may be directly accessed.

TABLE 3

| | |
|---|---|
| 250 | Procedure traverse(0) |
| 252 | begin |
| 254 |   v=r |
| 256 |   for $(0 \leq \text{level} \leq T)$ |
| 258 |     v= v[O[1]] |
| 260 |   return every element in list pointed to by v |
| 262 | end |

The index 10 described above with reference to FIG. 1 works so long as the pruning function $f^m(1,q,O_q,o)$ is provided. The "performance" of the index is affected by how effective the pruning function is. Performance of the index may be measured by whether the method provides the correct pictographic name as the first choice, or by whether the method includes the correct name as one of several names within a list from which the user selects the correct document.

PRUNING FUNCTIONS

To compute $f^m(1,q,O_q,o)$, it is assumed that the following conditions are met by the underlying database of documents:

(1) All of the documents in the database are modeled by left-to-right HMMs, each HMM having N states. The transition probabilities of these HMMs may be the following:

$$a_{ij}=0.5 \text{ for } i=0,\ldots,N-2 \text{ and } j=i \text{ or } j=i+1 \quad (1)$$

$$a_{N-1,N-1}=1.0 \quad (2)$$

$$a_0=1, a_i=0 \text{ for } i=1,\ldots,N-1 \quad (3)$$

For all the documents in the database, a sequence of output symbols of length T is extracted. All inputs for which the index is to be used are presented in the form of a sequence of T output symbols, taken from the alphabet ($\Sigma$) of the HMMs.

Several variations of the pruning function $f^m$ may be used. The first exemplary pruning function is generated as follows:

Define $\phi_{i,j}^m$ to be the probability that the HMM $H_m$ is in state j at step i of its execution ($0 \leq i \leq T-1$, and $0 \leq j \leq N-1$). Notice that $\phi_{i,j}^m$ is independent of the output sequence O. Now, define $\Phi_i^m(o)$ to be the probability that the HMM $H_m$ outputs the symbol o at step i of execution $\Phi_i^m(o)$ may be computed using $\phi_{i,j}^m$ as follows:

$$\Phi_i^m(o) = \sum_{j=0}^{N-1} \phi_{i,j}^m b_j \quad (4)$$

$$f^m(i,q,O_q,o) = \Phi_i^m(o) \quad (5)$$

where, based on Equations (1)–(3):

$$\phi_{i,0}^m 32\ 0.5^i, \text{ for } i=0,\ldots,T-1 \quad (6)$$

$$\phi_{0,j}^m = 0, \text{ for } j=1,\ldots,N-1 \quad (7)$$

and $$\phi_{i,j}^m - 0.5(\phi_{i-1,j-1}^m + \phi_{i-1,j}^m) \quad (8)$$

for $i=1,\ldots,T-1$ and $j=1,\ldots,N-1$
where:

$$\phi_{i,j}^m = 0 \text{ for } 0 \leq i \leq j \leq N-1 \text{ and } i=1,\ldots,T-1 \quad (9)$$

Based on Equations (1) through (9), the process of computing $\phi$ and $\Phi$ is independent of which branch of the tree 10 is being processed. It is dependent only on the HMM model ($H_m$). As a result, when inserting an HMM model $H_m$ into the tree, a matrix $\Phi^m[\,][\,]$ of size T×N is built, such that $\Phi^m[i][j]$ corresponds to the probability that the $j^{th}$ output symbol appears at the $i^{th}$ step of executing the HMM $H_m$. That is, $$\Phi^m[i][j] = \Phi_i^m(oj) \quad (10)$$

The matrix $\Phi^m[i][j]$ is accessed while inserting the model $H_m$ into the tree 10 to prune the number of paths descended by the method of FIG. 3.

A second exemplary pruning function makes use of the dependencies between the output symbols. For example, instead of computing the probability that an output symbol appears at step i of the execution of an HMM, the probability that the sequence O[0]O[1] ... O[i] appears after executing the first i steps of the HMM may be computed. This leads to the second exemplary pruning function which depends on the path in the tree into which a new HMM is inserted.

The method is to insert the index m of an HMM $H_m$ into the linked list belonging to a leaf node q, when the probability that the sequence $O_q$=O[0]O[1], ..., O[T-1] (denoting the sequence of symbols in the path from the root 12 of the tree 10 to the node q) is produced by $H_m$ is high (or above a given threshold). This corresponds to the probability: Prob[O[0]O[1], ..., O[T-1] |$H_m$]. To save on insertion and preprocessing times, this probability should not be computed for every possible pattern (of length T) in the tree 10. As a result, the following pruning function is applied as the tree is descended. Hence entire subtrees may be pruned.

To use the second exemplary embodiment of the pruning function, define $\alpha_{i,j}^m$ to be the probability that the sequence O[0]O[1] ... O[i] is produced by the HMM after executing i steps and ending at state j. That is:

$$\alpha_{i,j}^m = \text{Prob}[O[0]O[1],\ldots,O[i] | \text{ the state} \quad (11)$$

at step i is equal to j]

At the time an HMM model $H_m$ is inserted into the tree 10, $\alpha$ is computed dynamically as the tree 10 is descended, while constructing the sequence O[0]O[1], ..., O[i] on the fly. Assume that the tree is descended in a depth-first order, to level j of the tree 10, at node q. The sequence $O_q$=O[0]O[1], ..., O[i] corresponds to the symbols encountered while descending from the root to q. In this case, $\alpha$ may be computed as follows:

$$\alpha_{0,0}^m = b_0(O[0]) \quad (12)$$

$$\alpha_{i,0}^m = \alpha_{i-1,0}^m b_0(O[i]) \quad (13)$$

$$\alpha_{0,j}^m = 0, \text{ for } j=1,\ldots,N-1 \quad (14)$$

$$\alpha_{i,j}^m = 0, \text{ for } 0 \leq i < j \leq N-1 \text{ and} \quad (15)$$

$$\alpha_{i,j}^m = 0.5(\alpha_{i-1,j}^m + \alpha_{i-1,j-1}^m)b_j(O[i]) \text{ for } 1 \leq j \leq i \leq N-1 \text{ and } i=1,\ldots,T-1 \quad (16)$$

The difference between the first and second exemplary pruning functions is that $\alpha$ depends on the output sequence produced up to step i of the computation, but $\phi$ does not. In addition, $\Phi$ depends only on one output symbol and not the sequence of symbols as does $\alpha$. The recursion process for computing $\alpha$ is the same as that used to compute $\phi$, except that the $\phi$ computations are replaced by $\alpha$ computations.

One way to reduce the time for computing $\alpha$ for all the paths is to maintain a stack of the intermediate results of the recurslye steps. When the traversing of a subtree is finished, the stack is popped up to the root level of the subtree (i.e., the node in the subtree closest to the root of the tree), and the recursion is started from there, instead of starting the computations from the root of tree 10. As the tree 10 is descended, to insert a model $H_m$, when processing a node q, processing starts from the $\alpha$'s in the parent of node q. One step of the recursive process is applied for computing $\alpha$ for each of the symbols in q. The resulting n computations are saved in the stack (there are n symbols in q).

While descending one of the subtrees below q, for example, at node u, the $\alpha$'s computed for node q are used in one additional step of the recursive formula for computing $\alpha$ and the corresponding $\alpha$'s at node u are obtained. This way the overhead for computing $\alpha$'s is minimal, because, for each node in the tree 10, one step of the recursive formula is applied for computing $\alpha$ for each symbol in the node. The entire procedure is performed only once per node; i.e., the $\alpha$'s for a node are not evaluated more than once.

To prune the subtrees accessed at insertion time, $\alpha$ is used to compute a new function $\phi_i^m$, which is the probability that a symbol O[i] appears at step i of the computation (i.e., $\phi_i^m$ is independent of the information about the state of the HMM). This may be achieved by summing $\alpha_{i,j}^m$ over all possible states j. Then, $$\phi_i^m = \text{Prob}[O[0]O[1],\ldots,O[i] | Hm \text{ is at step } i] \quad (17)$$

$$\phi_i^m = \sum_{j=0}^{N-1} \alpha_{i,j}^m \quad (18)$$

$\phi$ is computed for each symbol in a node and is compared to a threshold value. The subtree corresponding to a symbol is accessed only if its corresponding value of $\phi$ exceeds the threshold. In other words, the pruning function for each node is defined by:

$$f^m(1,q,O_q,o)=\phi_i^m \qquad (19)$$

The computations for $\phi$ are exact and hence may be computationally expensive to evaluate for each input pattern and each tree path that is accessed by the insertion algorithm. A third exemplary method is now provided, which is an approximation of the pruning function $\phi$, presented in Equations (17)–(19). The pruning function $\phi$ may be approximated, so that it is dependent only on the level of a node q and not on the entire tree path that leads to q.

Define $P_k^m(s)$ to be the computed probability (or an estimate of it) that a model predicts the output symbol s in the $k^{th}$ stage of executing the HMM $H_m$. Then, $p_0^m(s)$ is the probability of finding output symbol s in the first step. The inventors have determined that $p_k^m(s)$ may be estimated as follows:

$$p_k^m(s) = \sum_{j=0}^{N-1} A_{T-k+1,j} \qquad (20)$$

where $A_{T-k+1,j}$ is an upper bound of $\alpha_{i,j}$ defined by Equations (11)–(16) and is estimated as follows:

$$A_{T-k+1,j} = (0.5)^T \left\{ \binom{T-k+1}{j} b_0(O[k]) + \binom{T-k+1}{j-1} R_1 b_1(O[k]) + \ldots + \binom{T-k+1}{j-k+1} R_j b_j(O[k]) \right\} \qquad (21)$$

for $k \leq j \leq N-1$ where $R_r$ is the number of paths that may be taken to get to state r in k–1 steps and is evaluated as follows:

$$R_r = \binom{k-1}{r-1} \qquad (22)$$

Table 4 lists exemplary pseudocode for computing A and $p_k^m(s)$.

TABLE 4

| | |
|---|---|
| 270 | Procedure solve_recurrence(k,j) |
| 272 | begin |
| 274 | $A_{T-k+1,j} = 0$ |
| 276 | for i = j to 0 |
| 278 | $A_{T-k+1,j} = A_{T-k+1,j} + (j^{T-k+1})R_i b_i(O[k])$ |
| 280 | $A_{T-k+1,j} = (0.5)^T A_{T-k+1,j}$ |
| 282 | return($A_{T-k+1,j}$) |
| 284 | end |
| 286 | Function p(k,m,s) |
| 288 | begin |
| 290 | p = 0 |
| 292 | for (j = 0 to N – 1) |
| 294 | p = p+ solve_recurrence(k,j) |
| 296 | return(p) |
| 296 | end |

REDUCING STORAGE SPACE FOR THE TREE

As noted above, the size of the tree 10 (shown in FIG. 1) grows exponentially, as the number of symbols in the alphabet and document output sequence length grow. A further exemplary tree structure is now described, which is an enhancement over the tree 10 of FIG. 1, in terms of its storage complexity.

Figure 4A:
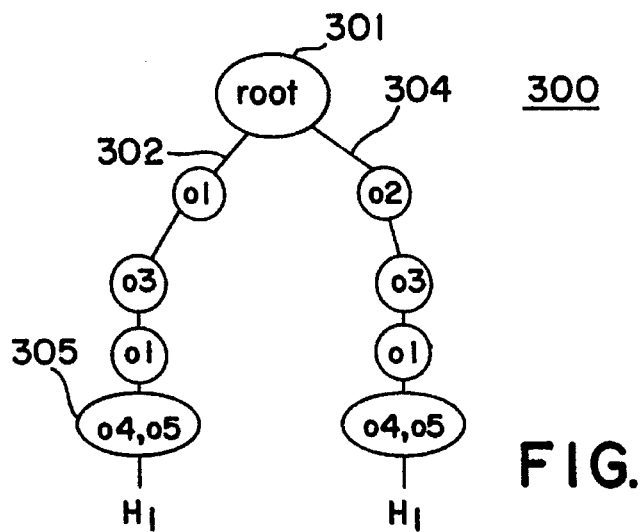
FIGS. 4A–4C are block diagrams of a further exemplary information tree according to the invention.
Figure 4B:
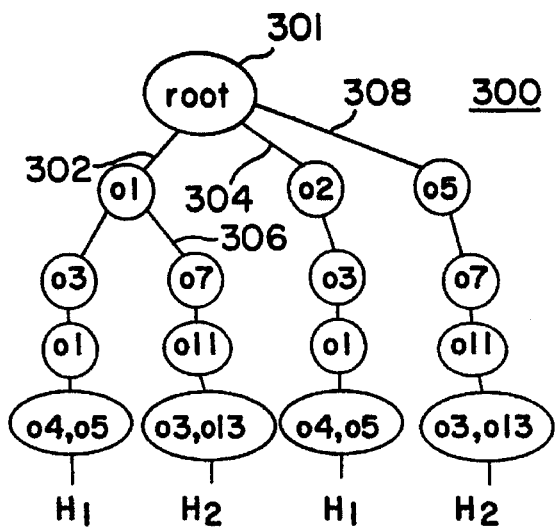
Figure 4C:
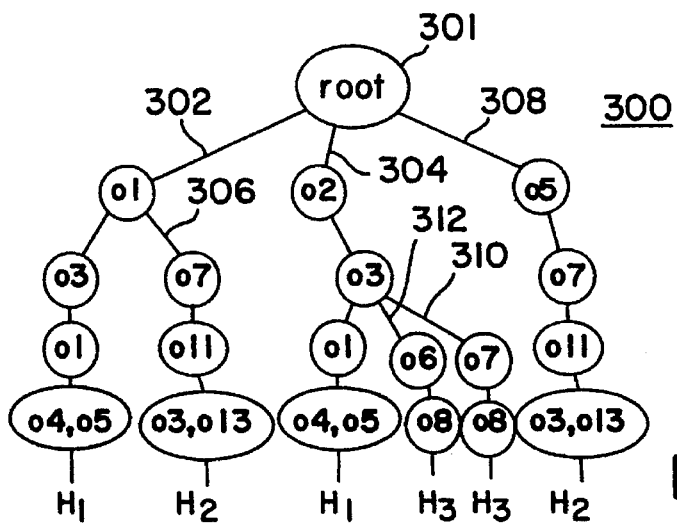

Referring now to FIGS. 4A to 4C, a second exemplary tree 300 is shown, in which the pruning function is used not only to prune the insertion time, but also to prune the amount of space occupied by the tree. Assume that a model $H_m$ is inserted into the tree. Given the pruning function (any of the functions $\Phi$, $\phi$, or p described above), a two dimensional matrix $p^m$ is computed, where each entry $P^m[i][o]$ corresponds to the probability that $H_m$ produces symbol o at step i of its execution. $p^m$ is of size n×T, and thus does not grow exponentially as the alphabet and output sequence sizes grow. From $P^m[i][o]$, a new vector $L^m$ is generated, where each entry in $L^m$, designated $L^m[i]$, contains only the symbols that have a high probability of being generated by $H_m$ at step i of its execution. In other words, each entry of $L^m$ is a list of output symbols such that:

$$L^m[i]=[o|P^m[i][o]>\epsilon_i \text{ for all } o, 0 \leq o < n] \qquad (23)$$

For example, exemplary vectors $L^1$, $L^2$, and $L^3$ are listed below in Table 5. Vectors $L^1$, $L^2$, and $L^3$ correspond to the HMMs $H_1$, $H_2$, and $H_3$, respectively.

TABLE 5

| $L^1$ | $L^2$ | $L^3$ |
|---|---|---|
| 01, 02 | 01, 05 | 02 |
| 03 | 07 | 03 |
| 01 | 011 | 06, 07 |
| 04, 05 | 03, 013 | 08 |

FIGS. 4A–4C are block diagrams showing the tree 300 that is formed from the vectors $L^1$, $L^2$, and $L^3$ according to this embodiment. For conciseness, pairs of nodes in the fourth level of tree 300 are shown within single ellipses (e.g., ellipse 305). It is understood that an ellipse having two symbol numbers represents two nodes. For example, ellipse 305 in FIG. 4A has the numbers 04 and 05, indicating a first node for the output symbol 04 and a second node for the output symbol 05. Additionally, the leaf nodes (which contain the linked lists of pointers to documents) in the fifth level of the tree 300 are omitted from FIGS. 4A to 4C for brevity.

In the example of FIGS. 4A, 4B and 4C, the alphabet size n is 13 symbols, and the sequence length is four. If every node were included in the tree without regard to whether the node is part of a probable output sequence (i.e., according to the method of FIG. 1), then tree 300 would have approximately $n^{T+1}=13^5=371,293$ nodes (including the leaf nodes, not shown in FIGS. 4A 4C). Instead, by only including the nodes in the high probability sequences, the size of the tree is reduced to 34 (including root and leaf nodes). Even when the size of the matrices $P^m[i][o]$ and $L^m$ are considered, the reduction in space is greater than three orders of magnitude.

Initially the tree 300 is empty, except for the root node 301. FIG. 4A shows the result of inserting $H_1$ into the tree 300. The fanout of each node in the tree 300 is less than n, the size of the alphabet. The output symbols are added in the internal nodes only as necessary. FIGS. 4B and 4C show the resulting tree 300 after inserting $H^2$ and $H^3$, respectively. The tree 300 is only expanded as necessary to include nodes that correspond to symbols within sequences most likely to represent at least one document. Hence, tree 300 avoids wasting space storing pointers to leaf nodes that do not have pointers to any documents.

The tree 300 has the advantages of both the tree 10 of FIG. 1 and the pruning functions $f^m$ used in FIG. 3, while surpassing the performance of both in terms of space complexity. The tree 300 has a searching time of O(T) similar to the tree 10 of FIG. 1, and uses the same pruning strategies for insertion as described above with reference to FIG. 3, hence reducing the insertion time.

HANDWRITTEN DATABASES

FIG. 7B is a schematic of a handwritten database, in which the database model is extended to allow datatypes to be handwritten objects. (The handwritten objects are stored in a pre-chosen format, such as in the form of strokes (symbols) described above, along with a set of parameters that facilitate their recognition). The user enters data in handwritten form and formulates queries based on the handwritten data, also using handwritten expressions. Although the relational model is used in the exemplary embodiment, a handwritten database according to the invention may be practiced using any database model.

Figure 5:
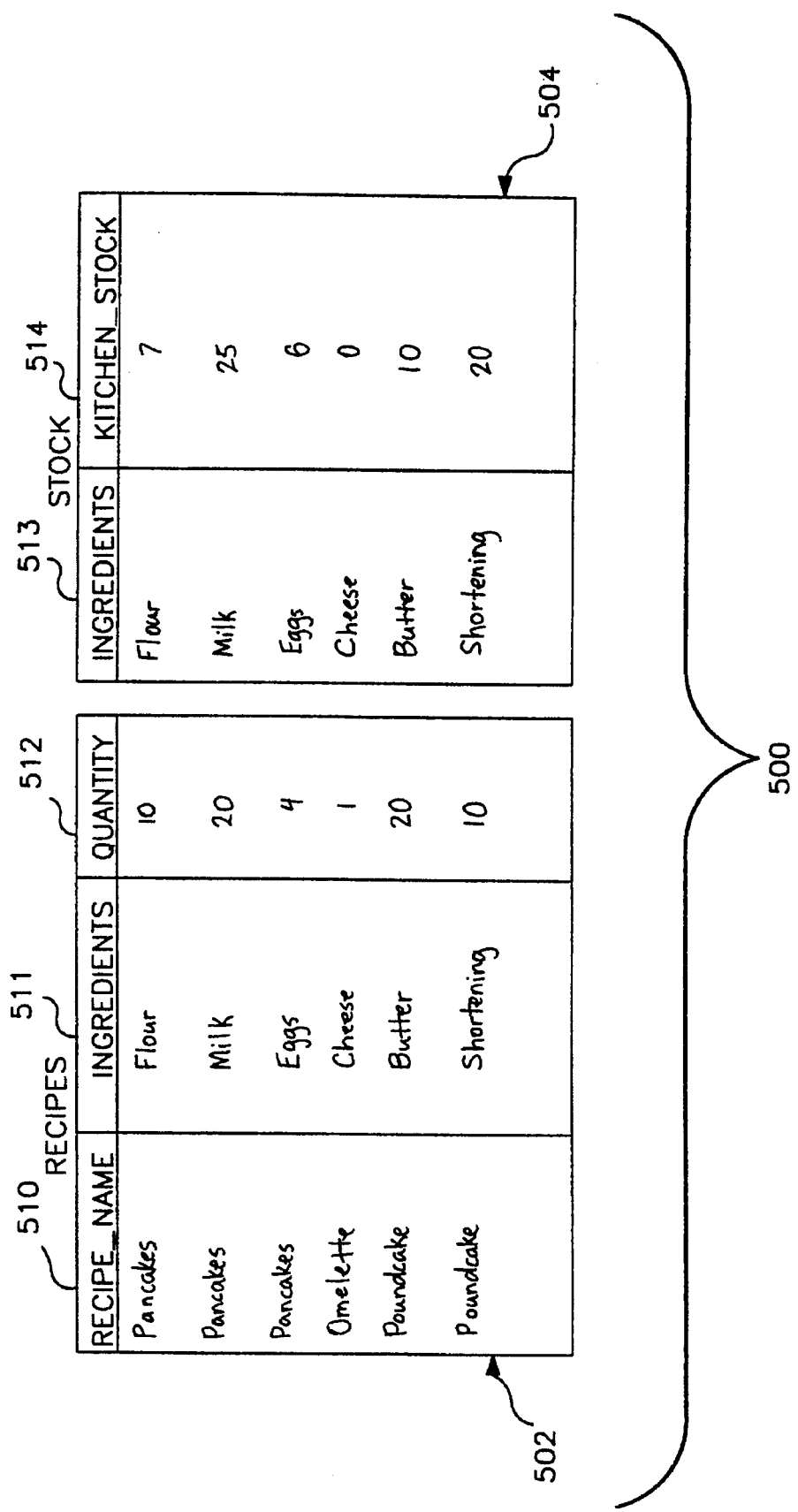
FIG. 5 is a diagram of an exemplary handwritten database according to a further embodiment of the invention.

FIG. 5 is a schematic diagram showing a handwritten database 500 which includes recipes and the stock of ingredients in the user's kitchen. Database 500 includes two relations: relation 502 includes recipe objects and relation 504 includes kitchen stock objects. Each object in relation 502 has three attributes: the recipe name ("RECIPE_NAME" 510), ingredient name ("INGREDIENTS" 511) and quantity needed to make the recipe ("QUANTITY" 512). Each object in relation 504 has two attributes: the ingredient name ("INGREDIENTS" 513) and quantity of the item in kitchen stock ("KITCHEN_STOCK" 514).

The information contained in database 500 is, in principle, equivalent to the information stored in a conventional database. However, the handwritten data types are handled differently from alphanumeric data. It is, however, noted that the schema definition in relational database 500 is not handwritten. That is, the attribute names "RECIPE_NAME", "INGREDIENTS", "QUANTITY", "INGREDIENTS" and "KITCHEN STOCK" are well known and stored as alphanumeric strings.

Whether the database is handwritten or conventional, the user needs a method to access the data in the database. In the handwritten database 500, a set of relational algebra relations are defined that are analogous to those used in conventional databases (well known to those of ordinary skill in the art), but are extended to accommodate relations in which the objects have at least one handwritten attribute.

The two main problems involved in working with a database including handwritten objects having attributes for which the domains of values include handwritten objects are as follows:

(1) When a query requests objects for which a handwritten attribute has a desired input value, a relational operator that compares the input value to the values stored in the database (e.g., the select operator) must be extended to check for close matches instead of just the exact matches that are found in conventional databases.

(2) When two or more data objects stored in the database have the same value for a common attribute, the respective handwritten objects representing the values of that attribute may differ from each other because of the nature of handwriting (It is almost impossible for a user to produce an exact replica of the stored instance freehand). A relational operator that includes a check for matching attribute values (e.g., project, natural join and set difference operators) must be extended to check for close matches instead of just the exact matches that are found in conventional databases.

Both of these problems may be addressed using HMMs to compare the handwritten objects within a database to each other, or to compare the handwritten objects to a handwritten input value in a query. In either case, the HMMs identify the probability of the handwritten objects matching. Moreover, by storing the results of the HMM analysis in an index at the time the data objects are inserted in the handwritten database (as described above with reference to FIG. 1 or FIG. 4C), the data in the handwritten database may be accessed rapidly in subsequent queries without repeating the execution of the HMM's.

As an example of problem number (1), the user may wish to find the ingredients needed to prepare pancakes. In a conventional database (not shown) storing equivalent information, the answer is generated by performing a select operation on the RECIPE relation with the value of the RECIPE_NAME attribute='Pancakes' and projecting the result over the INGREDIENTS attribute.

In handwritten database 500, the user may also wish to query the database 500 to find the tuples corresponding to the "PANCAKES" recipe. However, finding the tuples for which the attributes best approximate the handwritten expression in the query is a more complex task than finding tuples whose attributes exactly match an alphanumeric input value. The system analyzers. The similarities between the handwritten expression "$\mathcal{P}_{ancakes}$" and each of the handwritten instances stored in the attribute RECIPE_NAME of database 500. The comparison is based on partial matches, due to the nature of handwriting.

The system may rank the answers by decreasing probability and present them to the user as they fit in the screen. Alternatively, the system may present just the answer that best fits the handwritten data used in the query. The former approach is more advantageous if the query is likely to result in a plurality of correct 10 tuples. For example, in searching for ingredients in a $\mathcal{P}_{ancakes}$ recipe (Hereafter cursive text is used to indicate a handwritten data object), the correct response would include three items ($\mathcal{F}_{lour}$, $\mathcal{M}_{ilk}$ and $\mathcal{E}_{gg}$, as shown in FIG. 5), all of which are used to make pancakes. Limiting the response to a single item would not be appropriate unless the result relation is expected to only include one tuple.

FIG. 6A is a schematic diagram of a possible result relation 600 which may be generated by querying database 500 to select the objects for which the value of the Recipe_Name attribute is "$\mathcal{P}_{ancakes}$". The correct result relation should include tuples 602a–602c. In this example, the system has presented some incorrect tuples 602d and 602e in the result relation (those tuples corresponding to the recipe of "$\mathcal{P}_{oundcake}$").

The "$\mathcal{P}_{oundcake}$" items 602d and 602e are included in result relation 600 because the algorithm used to compare handwritten input objects (from the query) to the handwritten objects stored in the database identifies them as being sufficiently similar to the stored handwritten objects to be considered a match. The threshold probability used to define a match may be adjusted to require greater similarity (reducing incorrect items found by the selection), but if the probability threshold is adjusted too high, then the chance of overlooking one of the correct objects increases.

Similarity matching may be defined more formally in the following way. Given two handwritten objects $O_1$ and $O_2$, there is a procedure that will output a probability p that the two objects match. In the exemplary embodiment, that procedure is based in the usage of Hidden Markov Models (HMMs) to model the objects, as described above. For instance, one may choose the best model that describes $O_1$ and find the probability p with which that model describes $O_2$.

Following this, the select operator that uses an expression:

Attribute$_i$=E over a relation R, where E is a handwritten object, may be viewed as an operation in which tuples $t_j$ in R are selected in such a way that if $O_{ij}$ is the value of $Attribute_i$ in the tuple, then E and $O_{ij}$ match with probability greater or equal to p. Note that p may be implicitly determined by the system or explicitly set by the user. One of ordinary skill in the art of developing software could construct a variation of the invention in which the system adjusts the value of p based on factors such as screen size or desired response time.

An example of problem (2) is the natural join operation. To illustrate, assume that the user wants to determine the quantities of each ingredient needed to make pancakes, and the kitchen stock of each of those ingredients. The information required is in two different relations 502 and 504. The join operation forms a Cartesian product of relations 502 and 504, and performs a selection forcing "equality" on the attribute (INGREDIENTS) that appears in both relation schemes. In a conventional database, the join operation also eliminates duplicate columns from the result relation. However, in a handwritten database, there is a chance that the system will incorrectly identify an object of the first relation 502 as having the same value as an object of the second relation 504. For this reason, in a handwritten database, it may be desirable to keep the duplicate columns in the result relation, to facilitate detection of incorrect objects in the result relation.

FIG. 6B is a schematic diagram showing a possible result relation formed by joining relation 502 (shown in FIG. 5) with relation 504. Again, the system uses similarity measures to pair the values of the common attributes INGREDIENTS 511 in relation 502 and INGREDIENTS 513 in relation 504. The attributes INGREDIENTS 511 and INGREDIENTS 513 are both retained in result relation 600. A quick comparison of the two INGREDIENTS columns (INGREDIENTS 660 from column 511 of relation 502, and INGREDIENTS 661 from column 513 of relation 504) reveals that three of the tuples 652a, 652b and 652d are properly included in the result relation 650. Due to the similarity matching, an additional tuple 652c is incorrectly included in the result relation 650.

Formally, the natural join operator may be viewed as follows. Given relations $R_1$ and $R_2$, in which $A_{1j}$ and $A_{2j}$ are attributes of $R_1$ and $R_2$ respectively, the natural join of the two relations over $A_{1j}, A_{2j}$ is defined as the tuples $O_{11}, O_{12}, O_{1j}, O_{2j}, O_{21}, \ldots$, such that $O_{1k}$ are the values of attributes of $R_1$ and $O_{2k}$ are the values of attributes of $R_2$, $O_{1i}$ is the value of attribute $A_{12}$, $O_{2j}$ the value of attribute $A_{2j}$, and $O_{1j}$, $O_{2j}$ match with probability greater or equal to p.

As is the case with the select operation (or other relational operators, such as the project or set difference operators), the value of p may be adjusted to decrease the likelihood that incorrect tuples are included in the result relation (so long as p is not set too high, which would cause tuples to be incorrectly omitted from the result relation).

The result relations 600 and 650 of FIGS. 6A and 6B, respectively, each include errors that are readily detected by visual inspection when they are displayed. Thus, one strategy is to set p low enough so that any tuple that belongs in the result relation is not omitted, even if some extra tuples are incorrectly identified in the result relation. The user may then edit the result relation to delete those tuples (602d and 602e in relation 600, and 652c in relation 650) that do not belong in the result relation.

In conventional databases, database operations are carried out efficiently with the help of indices. The indexes help to find the tuples involved in an operation. Indexes are usually built for specific attributes in conventional relations.

According to the present invention, HMMs are used to index handwritten data. As FIG. 7A shows, index 10 points to the actual data objects $D_1$–$D_3$ and helps find the objects that are similar to a given input.

FIG. 7B shows index 700, which is the same as index 10 (shown in FIG. 7A), except that the leaf nodes 741 in index 700 have linked lists of pointers to tuples in the database 500, instead of pointers to documents $D_1$–$D_3$. In a handwritten database 500, tuple attributes 510–512 of the handwritten type point to the handwritten data objects as shown in FIG. 7B. Then the indexing techniques of FIGS. 1 and 4C may be used to make the index point to tuples that in turn point to the objects that are similar to the one requested.

As illustrated by the above examples, the key to performing operations on handwritten databases lies in the process of matching attribute values. This is likely to benefit from the indexing techniques defined above.

Figure 9:
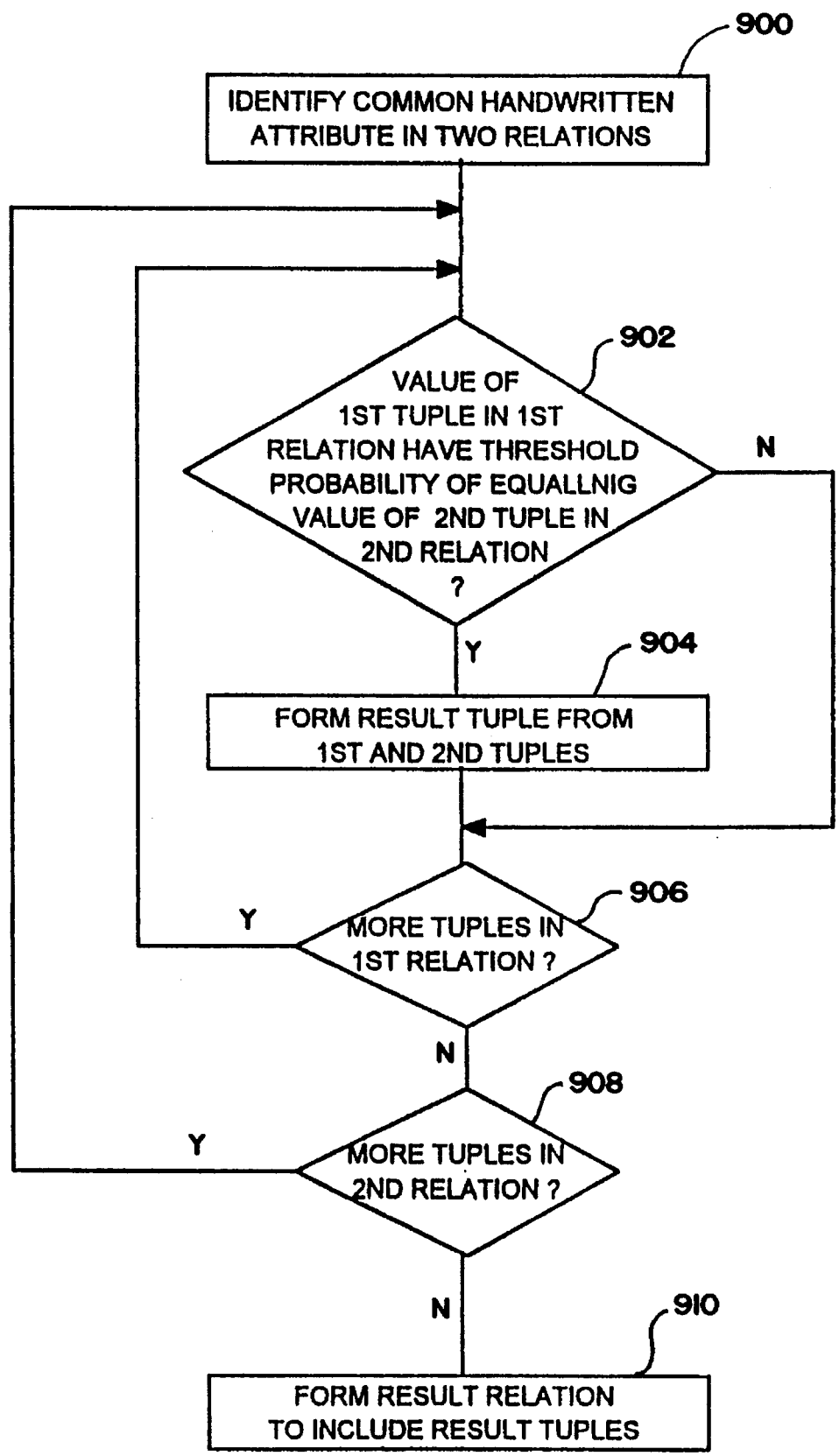
FIG. 9 is a flow chart diagram showing the join operation performed on the database shown in FIG. 5.

FIG. 9 is a flow chart diagram summarizing the steps for the handwritten database join operation. At step 900, one of the attributes that is common to first and second ones of the plurality of relations and has a domain of values that includes handwritten objects is identified as a common attribute. At step 902, a check is made whether the respective values of the common attribute for a first tuple from the first relation and a second tuple from the second relation have at least a threshold probability of being equal to one another. At step 904, if the the first and second tuple have at least the threshold probability of being equal, a result tuple is formed having the attribute values of the first tuple and the second tuple. At step 906, steps 902 and 904 are repeated for each tuple in the first relation. At step 908, steps 902, 904 and 906 are repeated for each tuple in the second relation. At step 910, the result relation is formed. The result tuples identified in step 904 are included in the result relation.

The result of a query in a standard database system is a static item. In the exemplary embodiment of the invention, the system may present the user with the best matches (highest probability) first and continue in order of decreasing probability. However, it is possible that to do so requires the application of a more expensive query processing algorithm. Thus, in some cases, it may be satisfactory to present a quick answer that just satisfies the matching criteria (probability higher than a given threshold) even though it does not produce the best match.

According to another aspect of the invention, a new kind of result relation that is dynamic may be provided. When a query is initially processed, the system performs a match using a fast algorithm and presents the best matches found. The result is less accurate than the best algorithms, but it is provided quickly. In the background, while the system awaits further input from the user, the query is recomputed using a more precise matching method or algorithm. At appropriate intervals, the result relation is updated to reflect the improved results. To the user, these updates are analogous to concurrent updates (e.g., objects being deleted from a multi-user database) by other users in a multi-user system.

A system would benefit from the existence of a family of techniques to match handwritten objects, from a very fast technique that selects a quick answer (not necessarily the best) to a slower technique that does a better job and finds the best answer. In general, the fast and slow techniques may either involve distinct mathematical algorithms, or may involve use of the same algorithm with respectively different degrees of accuracy. In the exemplary embodiment, the latter approach is followed.

For example, consider a database for which an index 700 (as shown in FIG. 7B) has been constructed. Two versions of a nested loop join algorithm may be used to perform the query. The first version, given an attribute value from the first relation, traverses the second relation and quits when it finds k answers that match the value with a probability bigger than 80%. The second one completes the entire loop and presents as the answer the k best matches. The first version is quick, but it may miss the best answer; whereas the second version is likely to be slower but it guarantees the quality of the answers. Using this technique, the user may get a quick, approximate answer to the query running the fast version and the system may run the second version in the background, giving the user a better answer later on.

Similarly, the index 700 shown in FIG. 7B may be traversed using different probability thresholds. The first time the tree is traversed, a high threshold (e.g., 85%) may be used. As the various paths through the tree are traversed, the system stops examining many of the paths as soon as a node is reached for which the probability of the partial sequence producing a match is at least as great as the threshold. Fewer paths are checked completely, resulting in rapid response, with fewer items identified in the response. During the second traversal of the tree, the threshold may be lowered, so that more paths are checked completely, with the likely result being that more tuples are included in the result relation.

Second, answers should be presented to the user as they fit in the screen. This has an impact in selecting parameters for the processing algorithms. Preferably, the results are presented in order of descending probability.

FIG. 10 is a flow chart diagram summarizing the steps for establishing the database and performing the interactive query. At step 950, a database is established which includes a plurality of data objects each defined by a respective tuple of attributes. The attributes include at least one attribute having a domain of values that includes handwritten objects.

At step 952, during preprocessing, an index is established, such that each path from the root node of the index to one of the plurality of leaf nodes corresponds to a respective input sequence of symbols, for which input sequence the respective leaf node includes a set of pointers to a subset of the tuples. At step 954, a respective HMM is executed to analyze the output sequence of each handwritten object and determine a respective probability that each input sequence matches the output sequence. At step 956, pointers are added in the leaf nodes, to any tuple for which the respective output sequence has at least a threshold probability of matching the input sequence corresponding to the leaf node, as determined by the respective HEM for the output sequence of each handwritten object. This completes the preprocessing of the handwritten data.

At step 958, the query process begins. An input sequence of symbols of the handwritten input object is identified. At step 960, one of the paths is traversed, the one path corresponding to the input sequence of the handwritten input object. At step 962, the subset of the tuples for which the value of the one attribute has at least a threshold probability of matching the input sequence of the handwritten input object are identified, from the pointers in the leaf node corresponding to the one path. At step 964, the data objects which correspond to the identified tuples are identified as being found by the query using a fast algorithm. At step 966, the results of the fast algorithm are displayed. At step 968, a second algorithm is executed in the background after executing the fast algorithm, to generate a second response to the query that is more accurate than the response displayed in step 966. The more accurate result is then displayed at step 970.

PQBE—A PEN-BASED VERSION OF THE QBE QUERY LANGUAGE

The internal system issues pertaining to handwritten databases are described above. This section focuses on the Pen-based Query-by-Example (PQBE) query language by which users express their insertions, updates, and queries. For simplicity, queries are described in detail, with only a brief mention of insertions and updates. The basic concepts for insertions and updates are similar to those applied with respect to queries.

PQBE, is an improvement on the Query By Example (QBE) language originally proposed in M. Zloof, "Query By Example: The Invocation and Definition of Tables and Forms", Proceedings of the International Conference on Very Large Data Bases, September, 1975, which is expressly incorporated by reference for its teachings on data manipulation languages for database systems. PQBE incorporates pen-based interaction concepts that are novel in their application to database query languages. PQBE may be used in a variety of computing environments, but it is particularly advantageous for use in palmtop computers or personal digital assistants (PDA's), which are too small to include a full-sized keyboard. PQBE is adapted for systems which use a stylus and a digitizer to convert pen strokes to symbols.

Figure 8:
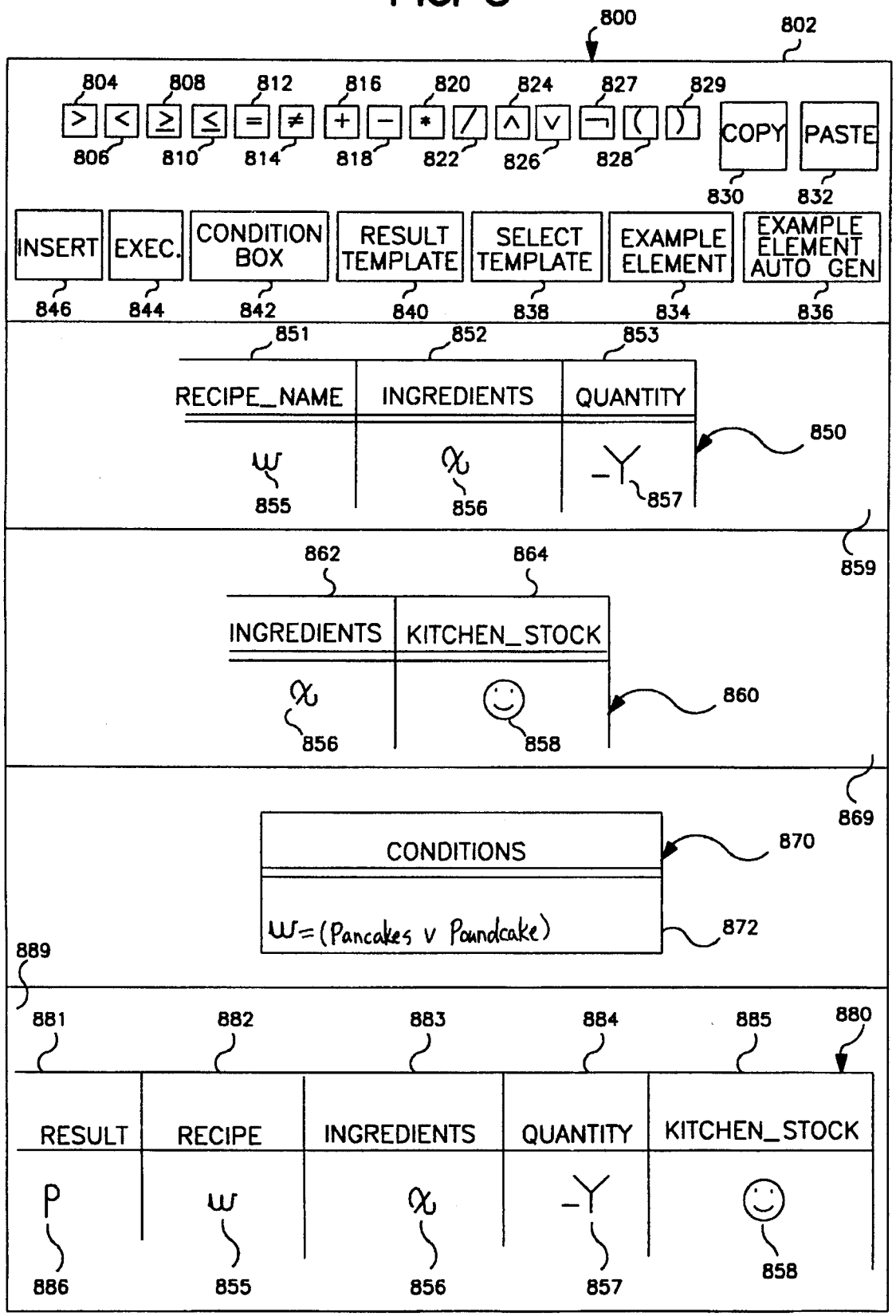
FIG. 8 is a view of the display of personal digital assistant or computer executing a Pen-Based Query-by-Example procedure to query the database shown in FIG. 5.

FIG. 8 shows an example of a PQBE display. The conventional operating system menu bar and tool bar are well known to those of ordinary skill in the field of programming, and are omitted from FIG. 8 for simplicity. Although FIG. 8 includes several keys or buttons 804–844, within tool field 802 of display 800, one of ordinary skill in the programming field could readily develop pop-up or pull down menus or dialog boxes including the same features shown within tool area 802.

Like QBE, PQBE is based upon templates or skeleton tables 850, 860, and 880. Each template 850, 860 and 880 is a table whose relation scheme is a relation scheme in the underlying database 500 (shown in FIG. 5), a view on that scheme (e.g., templates 850 and 860), or the result template 880 used to construct a result relation whose scheme is not a subset of an existing scheme.

Templates are selected from a menu using one of the standard techniques used for pen/mouse menu selection. For example, a button 838 may be provided for selecting a template. Menu selection 840 causes the display of a result template 880, and menu selection 842 causes the display of a condition box 870. Templates may be displayed by the user at any time during query formulation. Each template 850, 860 and 880 is displayed in a window 859, 869 and 889, respectively, so that standard window system commands (hide, pop, iconify, select icon, etc.) may be used. In particular, iconifying a template into which the user has entered some data is likely to be convenient for complex queries. (Conventional window borders, menu bars and tool bars, which are well known to one of ordinary skill in the software programming field, are omitted from FIG. 8 for simplicity). A menu item 844 allows the user to request execution of a completed query.

A QBE query is expressed by making entries in specific cells of the templates 850, 860 and 880. An entry may be 1. a data value
2. an "example element" (formally an example element is simply a domain variable in the domain relational calculus expression corresponding directly to the QBE query.)
3. an expression composed according to the normal QBE method using data values, example elements, or operators. The operators include comparisons (>, <, ≦, ≧, =, ≠), arithmetic operators (+, −, *, /), logical operators (∧, ∨, ¬), and parenthesized expressions. The operators may be entered by handwriting, or using keys 804–829. Because operators must be identified exactly for correct query processing, it may be preferable to use the keys 804–829 to enter operators.

In QBE, the user creates entries by positioning the cursor (by means of a pointing device) and typing the entry. In PQBE, entries are created in the following manner:

Data Values: A data value is entered as a handwritten item and stored in the system as a handwritten object. The value is written directly in the described cell. No matching or handwriting recognition need be done by the system at the time the value is written. Furthermore, there is no requirement that the value written correspond to data already in the database. (It may be advantageous to begin recognition, matching, or both as background tasks so as to provide faster response to subsequent requests that may require these operations.)

Example Element: In QBE, an example element is a variable whose name is a character string adorned by a special character, i.e., an underscore (_), that distinguishes it from a data value. In PQBE, the user may enter an example element the first time it appears in one of two ways:

1. The user may select the "example element" key 834 from the menu 802, and then hand write the name of the example element in the desired cell. For example, example elements 855 and 856 in template 850, and 858 in template 860 may be created by hand writing.

2. The user may select the "example element generated automatically" key 836 from the menu 802 and then point to the desired cell. The system chooses a name for the example element from the actual values in the database. The result is an automatically-generated, real-life example element—a new feature not previously incorporated in QBE. For example, example element 857 in template 850 may be automatically generated.

Note that the menu selection in the above manner may alternatively be replaced by gestures which are made using a stylus on the digitizer of the palmtop computer or personal digital assistant (PDA).

In either of the above cases, the system distinguishes example elements from data values in the display by using such techniques as reverse video, color, etc. The specific choice is dependent upon the features of the physical display.

It may be necessary for the user to enter the same example element more than once as part of a PQBE query. Consider the query "Find all ingredients used in either pancakes or poundcake, and identify the recipe, the quantity of the ingredient required, and the quantity of the ingredient in stock". This query requires that example element w appear in templates 850 and 855 and condition box 870; example element x appear in templates 850, 860 and 880; example element _Y appear in templates 850 and 880; and example element ⊘ appear in templates 860 and 880.

When an example element is entered for the second (or subsequent) time, it cannot be entered by either of the two methods described above. Instead, it is entered by copying the example element from another cell. The selection and copying of example elements is performed by the user using a standard "copy-and-paste" pen technique, for example, using keys 830 and 832. (It may use the same technique as the host operating system.)

The idea of example element copying, rather than the specific method by which the user effects the copying, is of key importance. The language semantics depend critically on equality of example element names. Thus, similarity matching (as used for data items) cannot be relied on for example elements. Copying is a simple technique that is both user-friendly and a means of overcoming a potential drawback of the use of a pen (handwriting) instead of a keyboard.

Operators: It is critical to the semantics of the language that operators be interpreted with perfect accuracy. Fortunately, there are relatively few operators to recognize, and some may be used only in restricted contexts. Equality may be expressed by copying rather than operator recognition. Logical operators may appear only in the condition box. Furthermore, the limited number of operators makes menu selection a feasible option in case recognition fails.

Using the above techniques, PQBE may be used to express any query that could be expressed using QBE. However, because data values are handwritten—both in the query and in the database—and approximate methods are used for matching data values, it is beneficial to support an interactive form of query specification. These interactive techniques augment the concepts described above to allow effective processing of handwritten data.

Insertions and updates are performed in a similar manner, and are not described in extensive detail herein. The user selects one of the templates corresponding to the relation to which a tuple is to be added. The tuple is inserted by selecting an insert button 846. The data are generally entered by handwriting; copying is not necessary.

INTERACTIVE QUERY SPECIFICATION

In commercial database systems, a user prepares a query, submits it, and receives a complete answer from the system. In personal databases suitable for handwritten databases, a user is likely to need only part of the answer. Even if the user wants the entire answer, the user may prefer to receive the answer a little bit at a time for personal convenience. This is especially true for a system in which only the best matches are shown initially, with further matches shown based on the user's wishes.

One method for achieving this result is to generate the entire answer, but show only part of it at a time. This has serious drawbacks in terms of responsiveness, since such an exhaustive computation may be expensive both in time and memory space. Alternatively, an incremental query execution that is guided by user reaction to initial answers may be used.

In QBE, each tuple in the result is generated by a particular binding of actual data values to example elements. This binding must be such that each row in each template corresponds to a tuple in the underlying relation or view. QBE displays result tuples in a result table.

In view of the above discussion about providing partial answers and allowing user interaction, the following variations of the present invention may be used:

(1.) Replacement of all example elements in the templates as displayed to the user with the bound values generating the first tuple in the result (that is, the tuple in the result with the best overall similarity match). This allows the user to see not only a tuple of the answer, but also how it was generated. In the event that the user formed the query improperly (that is, the actual semantics of the query do not match the user's intentions), the user may suspend the query, modify the templates, and re-execute the query. In the event that the user did indeed form the query correctly, but two handwritten data items were incorrectly identified by the system as similar, the user may note this error, and the matching algorithm incorporates feedback from the user into the remainder of its search. Thus, the procedure for processing handwriting queries "learns" as it computes the result.

(2.) A second variation is similar to item (1.) above except that the first n tuples of the result are shown along with all tuples in the templates that were used to generate these result tuples. This has the same features and advantages noted above. It lets the user consider several tuples at once, but may be of limited practicality on small displays. The value of n should depend upon display size, the number of templates, the time it takes to compute n tuples of the result (based on statistical estimation), and the probability of accuracy of the matches involved.

(3.) A third variation is similar to item (2.) above, except that only the result relation tuples are shown.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A method for generating and querying an indexed database stored in a computer system, comprising the steps of:

(a) establishing a database which includes a plurality of data objects each defined by a respective tuple of attributes, the attributes including at least one attribute having a domain of values that includes handwritten objects, each handwritten object including a plurality of symbols ordered in an output sequence; each symbol being a feature vector;

(b) establishing an index having a root node and a plurality of leaf nodes, each connected to the root node by a respective path, such that each path from the root node to one of the plurality of leaf nodes corresponds to a respective input sequence of symbols, for which input sequence the respective leaf node includes a set of pointers to a subset of the tuples;

(c) analyzing the output sequence of each handwritten object and determining a respective probability that each input sequence matches the output sequence;

(d) including, in the respective set of pointers in each respective leaf node, a pointer to any tuple for which the respective output sequence has at least a threshold probability of matching the input further plurality of symbols ordered in an input sequence and traversing one of the paths, the one path corresponding to a sequence of symbols which matches the respective input sequence of symbols of the handwritten input object.

2. A method according to claim 1, wherein step (e) includes:

identifying, from the pointers in the leaf node corresponding to the one path, the subset of the tuples for which the value of the one attribute has at least a threshold probability of matching the input sequence of the handwritten input object; and identifying the data objects which correspond to the identified tuples as being found by the query.

3. A method according to claim 1, wherein the database is a relational database plurality of relations and has a domain of values that includes: handwritten objects;

(2) repeating, for each tuple in the first relation and for each tuple in the second relation, the step of:

forming a result tuple having the attribute values of a first tuple from the first relation and a second tuple from the second relation, if the respective values of the common attribute for the first and second tuples have at least a threshold probability of being equal to one another;

(3) forming the result relation to include the result tuples identified in step (2).

4. A method according to claim 3, wherein the step of forming the result tuple includes:

(a) selecting the first tuple and identifying the input sequence of symbols that is included in the common attribute of the selected tuple;

(b) traversing one of the paths of the index, the one path corresponding to the identified input sequence;

(c) identifying, from the pointers in the leaf node corresponding to the one path, the subset of the tuples for which the value of the common attribute has at least a threshold probability of matching the identified input sequence;

(d) forming the result tuple if the second tuple is included in the subset of the tuples for which the value of the common attribute has at least a threshold probability of matching the identified input sequence.

5. A method according to claim 1, wherein the database is a relational database including a plurality of relations, and step (a) includes:

(1) displaying a skeleton table which represents a relation scheme of one of the plurality of relations, (2) entering a handwritten object in the skeleton table, and (3) storing the handwritten object entered in step (a) (2) as the value of the one attribute for one of the data objects.

6. A method according to claim 5, further comprising querying the database by the steps of:

(e) displaying the skeleton table, (f) entering a handwritten input object in the skeleton table, and (g) identifying, without executing a recognition operation any data object for which the value of the one attribute has at least a threshold probability of matching the handwritten input object as being found by the search.

7. A method according to claim 6, wherein the method is performed using a digitizing pad of a computer, the computer has an operating system which includes a copy and paste function, further comprising the steps of:

(h) entering a handwritten example element a first time by writing the handwritten example element in a first portion of the skeleton table, using the digitizing pad, and (i) entering the handwritten example element a second time by:

(1) copying the handwritten example element from the first portion of the skeleton table, and (2) pasting the handwritten example element into a second portion of the skeleton table, wherein steps (i) (1) and (i) (2) are performed using the copy and paste function.

8. A method according to claim 7, wherein the step of querying the database includes:

(j) selecting and copying from a menu one of an arithmetic operator and a logical operator, and (k) pasting the selected one of the arithmetic and logical operators into a condition box of the skeleton table, wherein steps (j) and (k) are performed using the copy and paste function.

9. A method for generating and querying an indexed database stored in a computer system, comprising the steps of:

(a) establishing a database which includes a plurality of data objects each defined by a respective tuple of attributes, the attributes including at least one attribute having a domain of values that includes handwritten objects, each handwritten object including a plurlaity of symbols ordered in an output sequence, each symbol being a feature vector: for which input sequence the respective leaf node includes a respective set of pointers to a subset of the tuples;

(c) analyzing the output sequence of each handwritten object and determining a respective probability that each input sequence matches the output sequence;

(d) including, in the respective set of pointers in each respective leaf node, a pointer to any tuple for which the respective output sequence has at least a threshold probability of matching the input sequence corresponding to the leaf node, as determined for the output sequence of each handwritten object; and (e) querying the database by inputting a handwritten input object to the computer system, said querying comprising the steps of,
  (1) executing a first query matching algorithm to generate an approximate response to the query,
  (2) displaying the approximate response,
  (3) executing a second query matching algorithm after executing the first query matching algorithm, to generate a second response to the query that is more accurate than the approximate response, and
  (4) displaying the second response.

10. A method for indexing and querying a database, comprising the steps of:

(a) establishing a database which includes a plurality of data objects defined by tuples of attributes, the attributes including at least one attribute having a domain of values that includes handwritten objects, each handwritten object including a plurality of output symbols ordered in an output sequence, each output symbol being a feature vector;

(b) modelling each handwritten object by a common alphabet including n output symbols, and a common output sequence length of T symbols, where n and T are integers;

(c) establishing an index for the one attribute, the index having T levels, each level between zero and T-1 having a respective minimum probability value, each level having at least one node;

(d) indexing the symbols in one of the handwritten objects by performing, for each node in one of the levels of the index, the steps of:
  (1) determining a probability that a symbol stored in said node represents a corresponding output symbol in the one handwritten object,
  (2) adding a node in a next level of the index, if the probability determined in step (d) (1) exceeds the minimum probability value of the one level and the next level is between the oneth level and the T-1th level,
  (3) executing step (d) for the added node in the next level, if the node is added in step (d) (2), and
  (4) adding a pointer to the one handwritten object in a list of pointers stored in a node in the Tth level of the index, if the next level is the Tth level and the probability determined in step (d) (1) is greater than the minimum probability value of the T-1th level;

(e) repeating step (d), for each of the plurality of handwritten objects other than the one handwritten object; and (f) querying the database by inputting to the computer system a handwritten input objects including a further plurality of symbols ordered in an input sequence and matching the respective input sequence of symbols of the handwritten input object to the output sequence of output symbols included in one of said handwritten objects.

11. A method for generating and querying a database stored in a computer system, comprising the steps of:

(a) establishing a database which includes a plurality of data objects each defined by a respective tuple of attributes, the attributes including at least one attribute having a domain of values that includes handwritten objects, each handwritten object including a probability that each input sequence matches the output sequence;

(c) including in an index of the database a pointer to any tuple for which the respective output sequence has at least a threshold probability of matching the input sequence, as determined for the output sequence of each handwritten object; and (d) querying the database by inputting to the computer system a handwritten input object including a further plurality of symbols ordered in an input sequence and matching the respective inputs sequence of symbols of the handwritten input object to the output sequence of output symbols included in said handwritten objects.

* * * * *

UNITED STATES PATENT AND TRADE MARK OFFICE
CERTIFICATE OF CORRECTION

PATENT NO. : 5,524,240
DATED : June 4, 1996
INVENTOR(S) : Barbara et al.

It is certified that error appears in the above-identified patent and that said Letters Patent is hereby corrected as shown below:

On the cover page, item [56} References Cited, add the following:

U.S. PATENT DOCUMENTS

| | | |
|---|---|---|
| 3,588,823 | 6/1971 | Chow et al. |
| 4,028,673 | 6/1977 | Taylor et al. |
| 4,419,740 | 12/1983 | Hevenor, Jr. |
| 5,033,087 | 7/1991 | Bahl et al. |
| 5,065,431 | 11/1991 | Rollett |
| 4,553,206 | 11/1985 | Smutek et al. |
| 4,601,012 | 7/1986 | Aiken, Jr. |
| 4,975,975 | 12/1990 | Filipski |
| 5,014,327 | 5/1991 | Potter et al. |
| 5,123,057 | 6/1992 | Verly et al. |
| 5,129,002 | 7/1992 | Tsuboka |
| 5,136,687 | 8/1992 | Edelman et al. |
| 5,151,950 | 9/1992 | Hullender |
| 5,202,986 | 4/1993 | Nickel |
| 4,653,107 | 3/1987 | Shojima et al. |
| 5,241,619 | 8/1993 | Schwartz et al. |
| 5,226,091 | 7/1993 | Howell et al. |

UNITED STATES PATENT AND TRADE MARK OFFICE
CERTIFICATE OF CORRECTION

PATENT NO. : 5,524,240
DATED : June 4, 1996
INVENTOR(S) : Barbara et al.

It is certified that error appears in the above-identified patent and that said Letters Patent is hereby corrected as shown below:

OTHER PUBLICATIONS

Lopresti, D.P. & Tomkins, A., "Approximate Matching of Hand-Drawn Pictograms", IWFHR III, Buffalo, NY, May 25-27, 1993 (pp. 102-111).

Lopresti, D.P. & Tomkins, A., "Pictographic Naming", INTERCHI '93 Adjunct Proceedings, (pp. 77-78).

Vrbsky S.V. & Liu, J.W.S., "APPROXIMATE - A Query Processor that Produces Monotonically Improving Approximate Answers", IEEE Transactions on Knowledge & Data Engineering, Vol. 5, No. 6, December 1993 (pp. 1056-1068).

Zloof, M.M., "Query-by-Example" a data base language", IBM Syst. J. No. 4, 1977 (pp. 324-343).

Bose, C.B. & Kuo, S., "Connected and Degraded Text Recognition Using Hidden Markov Model, IEEE 1992 (pp. 116-119).

Tappert, C.C., Suen, C.Y. & Wakahara, T., "The State of the Art in On-Line Handwriting Recognition", IEEE Transactions on Pattern Analysis & Machine Intelligence, Vol. 12, No. 8, August 1990 (pp. 787-808).

Barbara, D. Garcia-Molina, H. & Porter, D., "The Management of Probabilistic Data", IEEE Transactions on Knowledge & Data Engineering, vol. 4, no. 5, October 1992 (pp. 487-502).

UNITED STATES PATENT AND TRADE MARK OFFICE
CERTIFICATE OF CORRECTION

PATENT NO. : 5,524,240
DATED : June 4, 1996
INVENTOR(S) : Barbara et al.

It is certified that error appears in the above-identified patent and that said Letters Patent is hereby corrected as shown below:

OTHER PUBLICATIONS

Stonebraker, M., Jhingran, A., Goh, J. & Potamianos, S., "On Rules, Procedures, Caching and Views in Data Base Systems", ACM 1990 (pp. 281-290).

Barbara, D. & Alonso, R., "Processing Continuous Queries in General Environments", Matsushita Information Tech. Lab., June 4, 1993 (pp. 1-30).

Lopresti, D. & Tomkins, A., "A New Paradigm for Pen Computing", MITL-TR 71-93, Matsushita Information Tech. Lab., October 14, 1993 (pp. 1-16).

Aref, W.G., Vallabhaneni, P. & Barbara, D., "Towards a Realization of Handwritten Databases: I Training and Recognition", MITL-TR-98-94, Matsushita Information Tech. Lab., April 4, 1994 (pp. 1-18).

Aref, W.G., "The Handwritten Trie: An Indexing Method for Handwritten Databases", MITL-TR-107-94, Matsushita Information Tec. Lab., April 29, 1994 (pp. 1-20).

Lopresti, D.P. & Tomkins A., "Pictographic Naming", MITL-TR-21-92, Matsushita Information Tech. Lab., August 28, 1992 (pp. 1-18).

Lopresti, D.P. & Tomkins, A., "Applications of Hidden Markov Models to Pen-Based Computing", MITL-TR-32-92, Matsushita Information Tech. Lab., Nov. 9, 1992 (pp. 1-16).

UNITED STATES PATENT AND TRADE MARK OFFICE
CERTIFICATE OF CORRECTION

PATENT NO. : 5,524,240
DATED : June 4, 1996
INVENTOR(S) : Barbara et al.

It is certified that error appears in the above-identified patent and that said Letters Patent is hereby corrected as shown below:

OTHER PUBLICATIONS

Korth, H.F. & Silberschatz, A., "Database Concepts", McGraw-Hill, Inc., 1991, 2nd Ed., Chapter 4.2 (pp. 121-134).

Chen, M. Kundu, A., & Zhou, J., "Off-Line Handwritten Word Recognition (HWR) Using a Single Contextual Hidden Markov Model", IEEE, 1992 (pp. 669-672).

Kundu, A. & Bahl, P., "Recognition of Handwritten Script: A Hidden Markov Model Based Approach", M4.20, IEEE 1988, (pp. 928-931).

Vlontzos, J.A. & King, S.Y., "A Hierarchical System for Character Recognition", ISCAS, IEEE, 1989 (pp. 1-4).

Yamato, J., Ohya, J. & Ishii, K., "Recognizing Human Action in Time-Sequential Images using Hidden Markov Model", IEEE, 1992 (pp. 379-385).

In Column 23, line 32, delete ";" insert therefor --,--.

In Column 23, line 39, between "a" and "set" insert --respective--.

UNITED STATES PATENT AND TRADE MARK OFFICE
CERTIFICATE OF CORRECTION

PATENT NO. : 5,524,240  
DATED : June 4, 1996  
INVENTOR(S) : Barbara et al.

It is certified that error appears in the above-identified patent and that said Letters Patent is hereby corrected as shown below:

In Column 23, lines 47-52, claim 1, after "input" delete "further plurality of symbols ordered in an input sequence and traversing one of the paths, the one path corresponding to sequence of symbols which matches the respective input sequence of symbols of the handwritten input object" and insert therefor --sequence corresponding to the leaf node, as determined for the output sequence of each handwritten object; and (e) querying the database by inputting to the computer system a handwritten input object including a further plurality of symbols ordered in an input sequence and traversing one of the paths, the one path corresponding to a sequence of symbols which matches the respective input sequence of symbols of the handwritten input object.--

Column 23, lines 64-65, claim 3, after "database" delete "plurality of relations and has a domain of values that includes: handwritten objects" and insert therefor -- including a plurality of relations, the method further comprising executing a join operation by the steps of:

(1) identifying as a common attribute one of the attributes that is common to first and second ones of the plurality of relations and has a domain of values that includes handwritten objects;--.

UNITED STATES PATENT AND TRADE MARK OFFICE
CERTIFICATE OF CORRECTION

PATENT NO. : 5,524,240
DATED : June 4, 1996
INVENTOR(S) : Barbara et al.

It is certified that error appears in the above-identified patent and that said Letters Patent is hereby corrected as shown below:

Column 25, lines 10-12, claim 9, should read:  -- being a feature vector;

(b) establishing an index having a root node and a plurality of leaf nodes, each connected to the root node by a respective path, such that each path from the root node to one of the plurality of leaf nodes corresponds to a respective input sequence of symbols, for which input sequence the respective leaf node includes a respective set of pointers to a subset of the tuples;--.

Column 26, lines 36-37, claim 11, delete "probability that each input sequence matches the output sequence;" and insert therefor --plurality of symbols ordered in an output sequence, each symbol being a feature vector;

(b) analyzing the output sequence of each handwritten object and determing a respective probability that each input sequence matches the output sequence;--.

Signed and Sealed this

Fourth Day of November, 1997

*Attest:*

*Attesting Officer*

BRUCE LEHMAN

*Commissioner of Patents and Trademarks*